United States Patent
Oishi et al.

(10) Patent No.: US 12,189,050 B2
(45) Date of Patent: Jan. 7, 2025

(54) CONTROL DEVICE, SYSTEM, AND CONTROL METHOD

(71) Applicant: KABUSHIKI KAISHA TOKAI RIKA DENKI SEISAKUSHO, Aichi (JP)

(72) Inventors: Yoshiki Oishi, Aichi (JP); Kenichi Koga, Aichi (JP); Tatsuya Koike, Aichi (JP); Satoshi Mori, Aichi (JP); Kento Kataoka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 398 days.

(21) Appl. No.: 17/843,295

(22) Filed: Jun. 17, 2022

(65) Prior Publication Data

US 2023/0060556 A1    Mar. 2, 2023

(30) Foreign Application Priority Data

Sep. 2, 2021   (JP) .................................. 2021-143139

(51) Int. Cl.
  *G01S 5/04* (2006.01)
  *G01S 5/02* (2010.01)
(52) U.S. Cl.
  CPC .............. *G01S 5/04* (2013.01); *G01S 5/0278* (2013.01)
(58) Field of Classification Search
  CPC ........ G01S 5/0244; G01S 5/0226; G01S 3/48; G01S 5/0218; G01S 5/12; G01S 2205/01; G01S 3/043; G01S 3/10
  See application file for complete search history.

(56) References Cited

U.S. PATENT DOCUMENTS

2022/0113173 A1*   4/2022   Sevar ................... G01S 13/589

FOREIGN PATENT DOCUMENTS

JP   2010043996 A   *   2/2010
WO   2015/176776 A1       11/2015

* cited by examiner

Primary Examiner — Said M Elnoubi
(74) Attorney, Agent, or Firm — GREENBLUM & BERNSTEIN, P.L.C.

(57) ABSTRACT

To estimate a positional relationship between devices having transmitted and received signals with higher accuracy.
A control device comprising:
  a control unit that performs control for estimating a positional relationship between a communication device having four or more antennas and another communication device on the basis of signals transmitted and received between the communication device and the other communication device, wherein
  the control unit applies a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performs control for estimating the positional relationship.

18 Claims, 14 Drawing Sheets

CONTROL DEVICE, SYSTEM, AND CONTROL METHOD

CROSS REFERENCE TO RELATED APPLICATION(S)

This application is based upon and claims benefit of priority from Japanese Patent Application No. 2021-143139, filed on Sep. 2, 2021, the entire contents of which are incorporated herein by reference.

BACKGROUND

The present invention relates to a control device, a system, and a control method.

In recent years, a technique for estimating a positional relationship between devices according to results of transmitting and receiving a wireless signal between devices has been disclosed. For example, International Publication No. WO2015/176776 discloses a technique in which an ultra-wideband (UWB) receiver estimates an incidence angle of a signal from a UWB transmitter by using a UWB signal.

SUMMARY

However, the technique disclosed in International Publication No. WO015/176776 has a problem that even though the accuracy of estimation of an incidence angle of a signal may decrease in an environment such as that with the presence of shielding between transmission and reception, no measures thereagainst are taken.

Therefore, the present invention has been made in view of the above problem, and an object of the present invention is to provide a novel and improved control device, system, and control method capable of estimating a positional relationship between devices that transmit and receive a signal with higher accuracy.

To solve the foregoing problem, according to an aspect of the present invention, there is provided A control device comprising: a control unit that performs control for estimating a positional relationship between a communication device having four or more antennas and another communication device on the basis of signals transmitted and received between the communication device and the other communication device, wherein the control unit applies a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performs control for estimating the positional relationship.

To solve the foregoing problem, according to another aspect of the present invention, there is provided A system comprising: a communication device that has four or more antennas; another communication device that has one or more antennas; and a control device that performs control for estimating a positional relationship between the communication device and the other communication device on the basis of signals transmitted and received between the communication device and the other communication device, wherein the control device applies a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performs control for estimating the positional relationship.

To solve the foregoing problem, according to another aspect of the present invention, there is provided A control method executed by a computer, comprising: transmitting and receiving signals between a communication device having four or more antennas and another communication device; and performing control for estimating a positional relationship between the communication device and the other communication device on the basis of the transmitted and received signals, wherein
the performing control for estimating a positional relationship between the communication device and the other communication device includes applying a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performing control for estimating the positional relationship.

As described above, according to the present invention, it is possible to estimate a positional relationship between devices that transmit and receive a signal with higher accuracy.

DETAILED DESCRIPTION OF THE EMBODIMENT(S)

Figure 1:
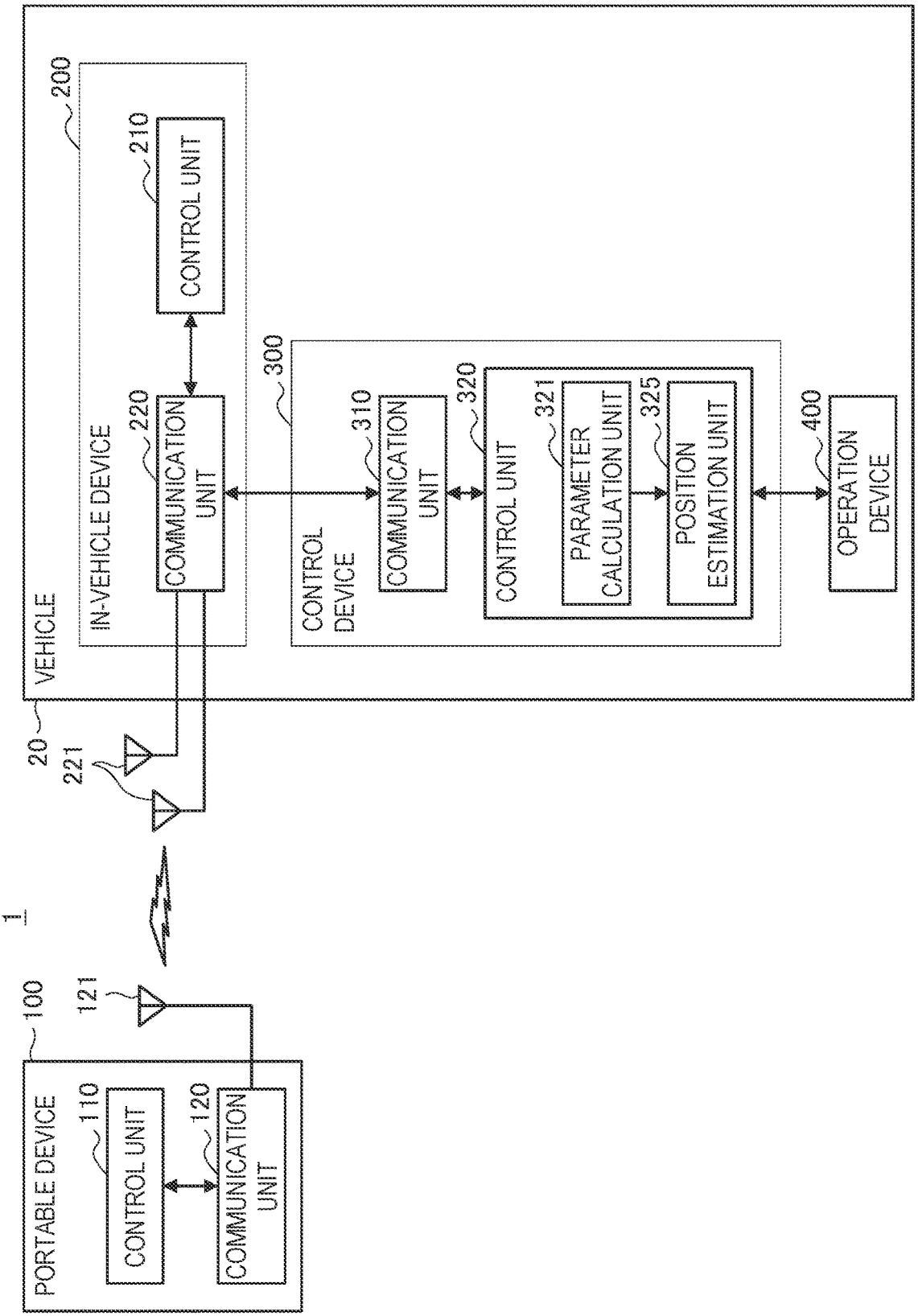
FIG. 1 is a block diagram illustrating an example of a configuration of a system 1 according to an embodiment of the present invention.

Hereinafter, a preferred embodiment of the present invention will be described in detail with reference to the accompanying drawings. In the present specification and the drawings, constituents having substantially the same functional configuration are given the same reference numerals, and thus repeated description will be omitted.

In the present specification and the drawings, constituents having substantially the same functional configuration may be distinguished by adding different letters or numbers after the same reference numeral. For example, a plurality of constituents having substantially the same functional configuration are distinguished as necessary, such as in-vehicle devices 200-1 and 200-2. However, in a case where it is not necessary to particularly distinguish a plurality of constituents having substantially the same functional configuration as each other, only the same reference numeral is given. For example, in a case where it is not necessary to distinguish between the in-vehicle devices 200-1 and 200-2, they are simply referred to as the in-vehicle device 200.

1. Configuration Example

FIG. 1 is a block diagram illustrating an example of a configuration of a system 1 according to an embodiment of the present invention. As shown in FIG. 1, the system 1 according to the present embodiment includes a portable device 100, an in-vehicle device 200, a control device 300, and an operation device 400.

The in-vehicle device 200, the control device 300, and the operation device 400 according to the present embodiment are mounted on a vehicle 20. The vehicle 20 is an example of a moving object, and is, for example, a vehicle licensed by a user (for example, a vehicle owned by the user or a vehicle temporarily rented to the user). A moving object according to the present embodiment includes not only the vehicle 20 but also an aircraft, a ship, and the like.

Portable Device 100

The portable device 100 is an example of another communication device, and is a device carried by a user who is using the vehicle 20. The portable device 100 may be an electronic key, a smartphone, a tablet terminal, a wearable terminal, or the like. As shown in FIG. 1, the portable device 100 includes a control unit 110 and a communication unit 120.

The control unit 110 controls the overall operation of the portable device 100. The control unit 110 causes the communication unit 120 to transmit, for example, a Poll (polling) signal that will be described later. The control unit 110 causes the communication unit 120 to transmit a Final signal that will be described later. The control unit 110 is configured with, for example, electronic circuits such as a central processing unit (CPU) and a microprocessor.

The communication unit 120 performs wireless communication with a communication unit 220 included in the in-vehicle device 200. For example, the communication unit 120 transmits a Poll signal under the control of the control unit 110. The communication unit 120 receives a Resp (response) signal transmitted from the communication unit 220 included in the in-vehicle device 200 as a response to the transmitted Poll signal. The communication unit 120 transmits a Final signal as a response to the received Resp signal under the control of the control unit 110.

The wireless communication between the communication unit 120 and the communication unit 220 included in the in-vehicle device 200 is realized by, for example, a signal compliant with ultra-wideband wireless communication (hereinafter, referred to as a UWB signal).

In wireless communication using a UWB signal, in a case where an impulse method is used, it is possible to measure an air propagation time of radio waves with high accuracy by using radio waves with a very short pulse width of nanoseconds or less, and thus to perform positioning and distance measurement based on the propagation time with high accuracy. The communication unit 120 is configured as, for example, a communication interface capable of performing communication using a UWB signal.

The UWB signal may be transmitted and received as a distance measurement signal and a data signal. The distance measurement signal is any of a Poll signal, a Resp signal, and a Final signal transmitted and received in a distance measurement process that will be described later. The distance measurement signal may be configured in a frame format having no payload portion for storing data, or may be configured in a frame format having a payload portion. On the other hand, the data signal is preferably configured in a frame format having a payload portion for storing data.

The communication unit 120 has at least one antenna 121. The communication unit 120 transmits and receives a wireless signal via at least one antenna 121.

In-Vehicle Device 200

The in-vehicle device 200 is an example of a communication device and is a device mounted on the vehicle 20. As shown in FIG. 1, the in-vehicle device 200 includes a control unit 210 and a communication unit 220.

The control unit 210 controls the overall operation of the in-vehicle device 200. The control unit 210 causes the communication unit 220 to transmit, for example, a Resp signal that will be described later. The control unit 210 is configured with, for example, electronic circuits such as a CPU and a microprocessor.

The communication unit 220 performs wireless communication with the communication unit 120 included in the portable device 100. The communication unit 220 receives a Poll signal transmitted from the communication unit 120 included in the portable device 100. The communication unit 220 transmits a Resp signal as a response to the received Poll signal under the control of the control unit 210. The communication unit 220 receives the Final signal transmitted from the communication unit 120 included in the portable device 100 as a response to the transmitted Resp signal.

The communication unit 220 has at least three or more antennas 221. The communication unit 220 transmits and receives wireless signals via three or more antennas 221. However, in a case where the control device 30 according to the present invention is applied in Example 1 that will be described later, the communication unit 220 needs to have at least four or more antennas 221.

Control Device 300

The control device 300 performs control for calculating a positional relationship between the portable device 100 and the in-vehicle device 200. As shown in FIG. 1, the control device 300 includes a communication unit 310 and a control unit 320. In the description of the present specification, an example in which the vehicle 20 according to the present embodiment is configured by separating the in-vehicle device 200 and the control device 300 will be described, but a function of the control device 300 may be realized by the portable device 100 or the in-vehicle device 200.

The communication unit 310 uses any communication method to perform various communications with the in-vehicle device 200. For example, the communication unit 310 receives information regarding a signal transmitted and received between the portable device 100 and the in-vehicle device 200 from the communication unit 220 included in the in-vehicle device 200. Any communication method may be wired communication or wireless communication. The communication unit 310 may perform various communications with the communication unit 120 included in the portable device 100 by using a wireless communication method.

The control unit 320 controls the overall operation of the control device 300. The control unit 320 performs control for estimating a positional relationship between the portable device 100 and the in-vehicle device 200 on the basis of, for example, a signal transmitted and received between the portable device 100 and the in-vehicle device 200. As shown in FIG. 1, the control unit 320 includes a parameter calculation unit 321 and a position estimation unit 325.

The control unit 320 is configured with, for example, electronic circuits such as a CPU and a microprocessor.

The parameter calculation unit 321 calculates, on the basis of a signal transmitted and received between the in-vehicle device 200 and the portable device 100, a reliability parameter that is an index indicating the degree of whether or not the signal is appropriate as a processing target for estimating a positional relationship between the portable device 100 and the in-vehicle device 200. Details of the reliability parameter will be described later.

The position estimation unit 325 estimates a positional relationship between the portable device 100 and the in-vehicle device 200 on the basis of the signal transmitted and received between the portable device 100 and the in-vehicle device 200. For example, the position estimation unit 325 calculates a distance measurement value between the portable device 100 and the in-vehicle device 200 on the basis of the signal transmitted and received between the portable device 100 and the in-vehicle device 200. The position estimation unit 325 estimates an arrival angle of a signal on the basis of the signal received from the portable device 100 by the in-vehicle device 200. The position estimation unit 325 calculates a two-dimensional position or a three-dimensional position of the portable device 100 on the basis of the calculated distance measurement value and the arrival angle of the signal. Various processes related to estimation of a positional relationship are executed by using the reliability parameter calculated by the parameter calculation unit 321, and details thereof will be described later.

Operation Device 400

The operation device 400 is a device that is operated under the control of the control device 300. The operation device 400 may be a door key of the vehicle 20 or an engine of the vehicle 20.

The configuration example of the system 1 according to the present embodiment has been described above. Subsequently, with reference to FIGS. 2 to 5, technical features of the system 1 according to the present embodiment will be described.

2. Technical Features 2.1. Multipath Environment

In processes based on a signal transmitted and received between the portable device 100 and the in-vehicle device 200, the estimation accuracy of a positional relationship may decrease depending on a radio wave propagation environment.

As an example of such a situation, there is a case where an object such as a pillar is present in a communication path from the antenna 121 to the antenna 221. In this case, for example, reception power of a transmitted and received signal may decrease, and thus the estimation accuracy of a positional relationship may decrease.

Another example of such a situation is a situation in which multipaths occur. The multipaths refer to a state in which a plurality of radio waves transmitted from a certain transmitter (for example, the communication unit 120) reach at a receiver (for example, the communication unit 220), and occur in a case where a plurality of radio wave paths are present between the transmitter and the receiver. In a situation in which multipaths are occurring, radio waves passing through a plurality of different paths may interfere with each other, and thus the estimation accuracy of a positional relationship may be reduced.

Therefore, a positional relationship between the portable device 100 and the in-vehicle device 200 estimated by the position estimation unit 325 may include an estimation error due to the multipath environment. Here, the control device 300 according to the present embodiment estimates a positional relationship between the portable device 100 and the in-vehicle device 200 by using a reliability parameter that is an index indicating the degree of whether or not a signal is appropriate as a processing target for estimating the positional relationship between the portable device 100 and the in-vehicle device 200 calculated on the basis of the signal received from the portable device 100 by the in-vehicle device 200. Thereby, the influence of an estimation error of a positional relationship caused by the above multipath environment can be reduced.

Hereinafter, an outline example of the system 1 according to the present embodiment will be described with reference to FIG. 2.

Figure 2:
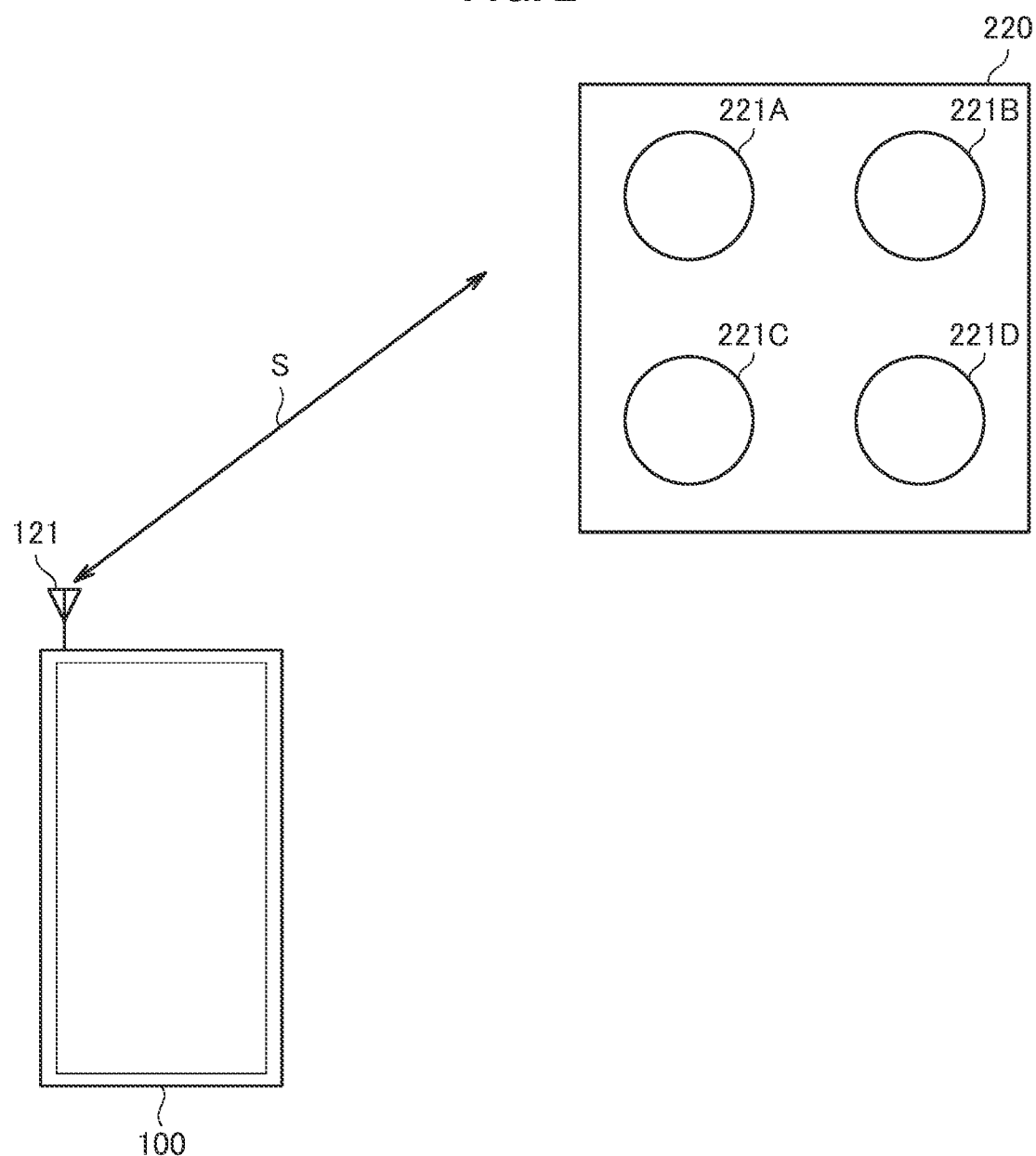
FIG. 2 is an explanatory diagram for describing an outline example of the system 1 according to the present embodiment.

FIG. 2 is an explanatory diagram for describing an outline example of the system 1 according to the present embodiment. As shown in FIG. 2, the communication unit 120 included in the portable device 100 has the antenna 121. The communication unit 220 included in the in-vehicle device 200 has, for example, an antenna 221A, an antenna 221B, an antenna 221C, and an antenna 221D as a four-element array antenna. However, the number of antennas included in the communication unit 120 included in the portable device 100 and the communication unit 220 included in the in-vehicle device 200 is not limited to the above example. For example, the number of antennas of the communication unit 120 may be a plural number, and the number of antennas 221 of the communication unit 220 may be five or more. In a case of applying the control device 300 according to the present invention in Example 2 or Example 3 that will be described later, the communication unit 220 may have three antennas 221.

A scale ratio of the communication unit 220 and the plurality of antennas 221 of the communication unit 220 is not limited to a scale ratio shown in the figure. For example, the antenna 221A, the antenna 221B, the antenna 221C, and the antenna 221D may be arranged at intervals of about ½ wavelength, respectively. An arrangement shape of the four antennas may be a square shape, a parallelogram shape, a trapezoidal shape, a rectangular shape, and any other shape. However, it is desirable that the plurality of antennas 221 are arranged on a plane, not on the same straight line.

In FIG. 2, the antenna 121 of the portable device 100 is disposed at the upper left end of the portable device 100, but a disposition position of the antenna 121 of the portable device 100 is not limited to the above example. For example, the antenna 121 may be disposed at any position in the portable device 100.

As shown in FIG. 2, for example, the antenna 121 may transmit and receive a signal S to and from at least one of the plurality of antennas 221 of the communication unit 220.

The communication unit 310 included in the control device 300 receives information regarding the signal S transmitted and received between the portable device 100 and the in-vehicle device 200 from either the communication unit 120 or the communication unit 220. Subsequently, the parameter calculation unit 321 may calculate a reliability parameter on the basis of the transmitted and received signal S. The position estimation unit 325 may estimate a positional relationship between the portable device 100 and the in-vehicle device 200 on the basis of the transmitted and received signal S.

2.2. CIR Calculation Process

The communication unit 120 included in the portable device 100 and the communication unit 220 included in the in-vehicle device 200 according to the present embodiment may calculate a channel impulse response (CIR) indicating characteristics of a wireless communication path between the communication unit 120 and the communication unit 220.

The CIR in the present specification is calculated by one (hereinafter, also referred to as a transmission side) of the communication unit 120 and the communication unit 220 transmitting a wireless signal including a pulse and the other (hereinafter, also referred to as a reception side) receiving the wireless signal. More specifically, the CIR in the present specification is a correlation calculation result that is a result of taking a correlation between the wireless signal transmitted by the transmission side (hereinafter, also referred to as a transmitted signal) and the wireless signal received by the reception side (hereinafter, also referred to as a received signal) for each delay time that is an elapsed time after the transmitted signal is transmitted.

The reception side calculates the CIR by taking a sliding correlation between the transmitted signal and the received signal. More specifically, the reception side calculates a value obtained by correlating the received signal with the transmitted signal delayed by a certain delay time as a characteristic (hereinafter, also referred to as a CIR value) in the delay time. The reception side calculates the CIR by calculating a CIR value for each delay time. That is, the CIR is time-series transition of the CIR values. Here, the CIR value is a complex number having an I component and a Q component. A sum of squares of the I component and the Q component of the CIR value may also be referred to as a power value of the CIR. In a distance measurement technique using UWB, the CIR value is also referred to as a delay profile. In the distance measurement technique using UWB, a sum of squares of the I component and the Q component of the CIR value is also referred to as a power delay profile.

Hereinafter, a CIR calculation process in a case where the transmission side is the portable device 100 and the reception side is the in-vehicle device 200 will be described in detail with reference to FIGS. 3 and 4.

Figure 3:
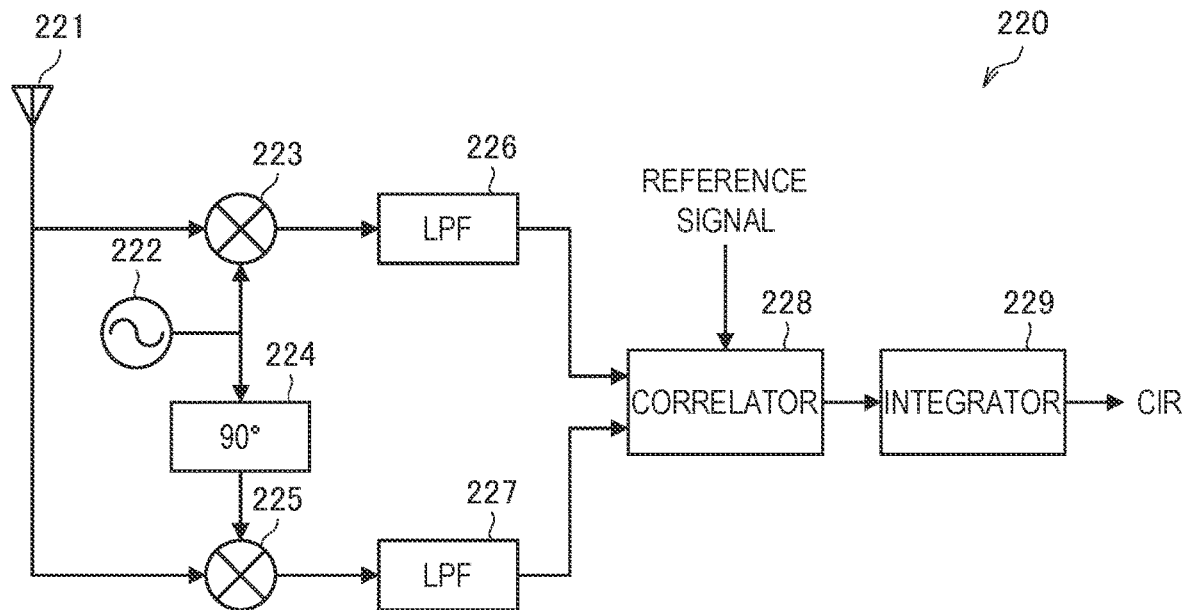
FIG. 3 is a diagram illustrating an example of a communication processing block of a communication unit 220 according to the present embodiment.

FIG. 3 is a diagram illustrating an example of a communication processing block of the communication unit 220 according to the present embodiment. As shown in FIG. 3, the communication unit 220 includes an oscillator 222, a multiplier 223, a 90-degree phase shifter 224, a multiplier 225, a low-pass filter (LPF) 226, an LPF 227, a correlator 228, and an integrator 229.

The oscillator 222 generates a signal having the same frequency as a frequency of a carrier wave that carries the transmitted signal, and outputs the generated signal to the multiplier 223 and the 90-degree phase shifter 224.

The multiplier 223 multiplies the received signal received by the antenna 221 by the signal output from the oscillator 222, and outputs a result of the multiplication to the LPF 226. The LPF 226 outputs a signal having a frequency equal to or lower than the frequency of the carrier wave carrying the transmitted signal among input signals to the correlator 228. The signal input to the correlator 228 is the I component (that is, a real part) of components corresponding to an envelope of the received signal.

The 90-degree phase shifter 224 delays a phase of the input signal by 90 degrees, and outputs the delayed signal to the multiplier 225. The multiplier 225 multiplies the received signal received by the antenna 221 and the signal output from the 90-degree phase shifter 224, and outputs a result of the multiplication to the LPF 227. The LPF 227 outputs a signal having a frequency equal to or lower than the frequency of the carrier wave carrying the transmitted signal among input signals to the correlator 228. The signal input to the correlator 228 is the Q component (that is, an imaginary part) of the components corresponding to the envelope of the received signal.

The correlator 228 calculates the CIR by taking a sliding correlation between the received signal configured with the I component and the Q component output from the LPF 226 and the LPF 227 and a reference signal. The reference signal here is the same signal as the transmitted signal before the carrier wave is multiplied.

The integrator 229 integrates and outputs the CIR output from the correlator 228.

The communication unit 220 performs the above process for each of the received signals received by the plurality of antennas 221.

Figure 4:
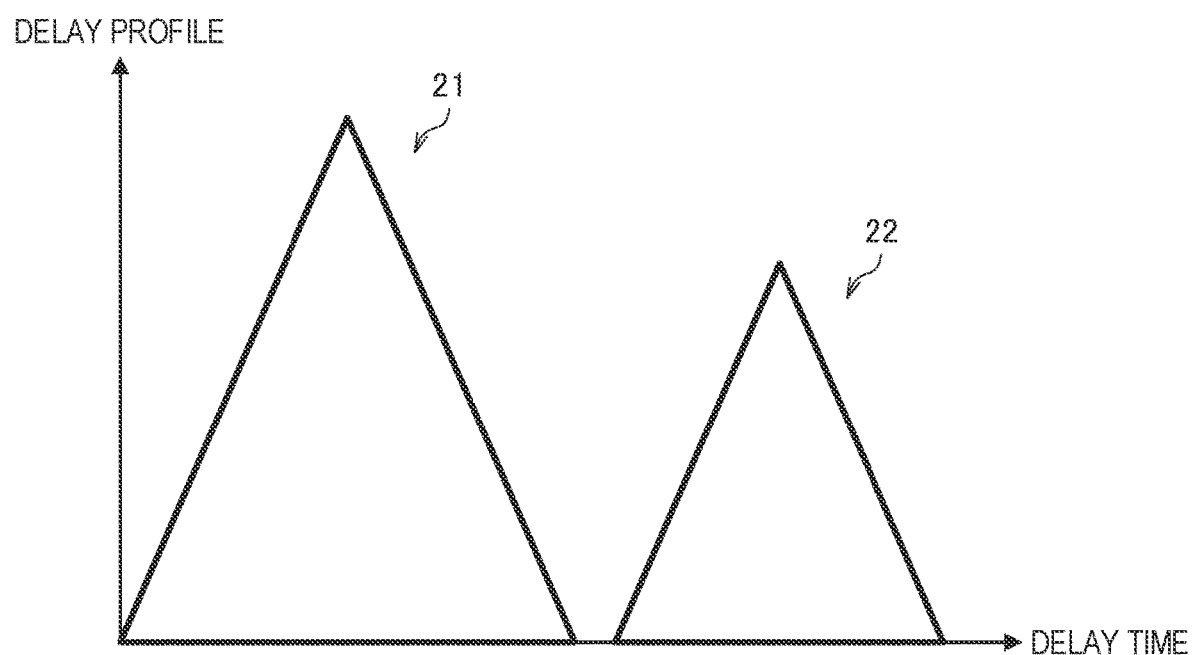
FIG. 4 is a graph illustrating an example of CIR according to the present embodiment output from an integrator 229.

FIG. 4 is a graph illustrating an example of the CIR according to the present embodiment output from the integrator 229. The horizontal axis of the graph is a delay time, and the vertical axis is a delay profile. One piece of information forming information that changes over time, such as a CIR value in a certain delay time in the CIR, is also called a sampling point. In the CIR, typically a set including sampling points between zero crossing points corresponds to a single pulse. A zero crossing point is a sampling point where a value becomes zero. However, this is not applied in a noisy environment. For example, a set of sampling points between intersections of a reference level other than zero and transition of the CIR value may be regarded as corresponding to one pulse. The CIR shown in FIG. 4 includes a set 21 of sampling points corresponding to a certain pulse and a set 22 of sampling points corresponding to another pulse.

The set 21 corresponds to, for example, a fast path pulse. A fast path refers to the shortest path between transmission and reception, and refers to a linear distance between transmission and reception in an environment in which there is no shield. A fast path pulse is a pulse that reaches a reception side through a fast path. The set 22 corresponds to, for example, a pulse arriving at a reception side through a path other than the fast path.

A pulse detected as a fast path pulse will also be referred to as a first arrival wave. The first arrival wave may be a direct wave, a delayed wave, or a composite wave. The direct wave is a signal that is directly received by a reception side (that is, without being reflected or the like) through the shortest path between transmission and reception. That is, the direct wave is a fast path pulse. The delayed wave is a signal that is indirectly received by the reception side via a non-shortest path between transmission and reception, that is, reflected or the like. The delayed wave is received by the reception side with a delay compared with the direct wave. A composite wave is a signal received by the reception side in a state in which a plurality of signals that have passed through a plurality of different paths are combined. In the following description, the first arrival wave will be simply referred to as a signal in some cases.

Subsequently, an example of a processing flow related to estimation of a positional relationship between the portable device 100 and the in-vehicle device 200 according to the present embodiment will be described.

2.3. Estimation of Positional Relationship (1) Distance Estimation

The position estimation unit 325 performs a distance measurement process. The distance measurement process is a process of estimating the distance between the portable device 100 and the in-vehicle device 200. The distance measurement process includes transmitting and receiving a distance measurement signal, and estimating a distance between the portable device 100 and the in-vehicle device 200, that is, a distance measurement value, on the basis of the time required for transmitting and receiving the distance measurement signal.

In the distance measurement process, a plurality of distance measurement signals may be transmitted and received between the portable device 100 and the in-vehicle device 200. Among the plurality of distance measurement signals, a distance measurement signal transmitted from one device to the other device will be referred to as a Poll signal. A distance measurement signal transmitted as a response to the Poll signal from the device that has received the Poll signal to the device that has transmitted the Poll signal will be referred to as a Resp signal. A distance measurement signal transmitted as a response to the Resp signal from the device that has received the Resp signal to the device that has transmitted the Resp signal will be referred to as a Final signal. Although the portable device 100 and the in-vehicle device 200 can transmit and receive any of the distance measurement signals, in the present specification, an example in which the portable device 100 transmits a Poll signal will be described.

(2) Arrival Angle Estimation

The position estimation unit 325 estimates an arrival angle of a signal transmitted and received between the devices. In the present specification, a Final signal included in the distance measurement signals will be described as a signal for estimating an arrival angle.

Hereinafter, an example of a process related to distance estimation and arrival angle estimation will be described with reference to FIG. 5.

Figure 5:
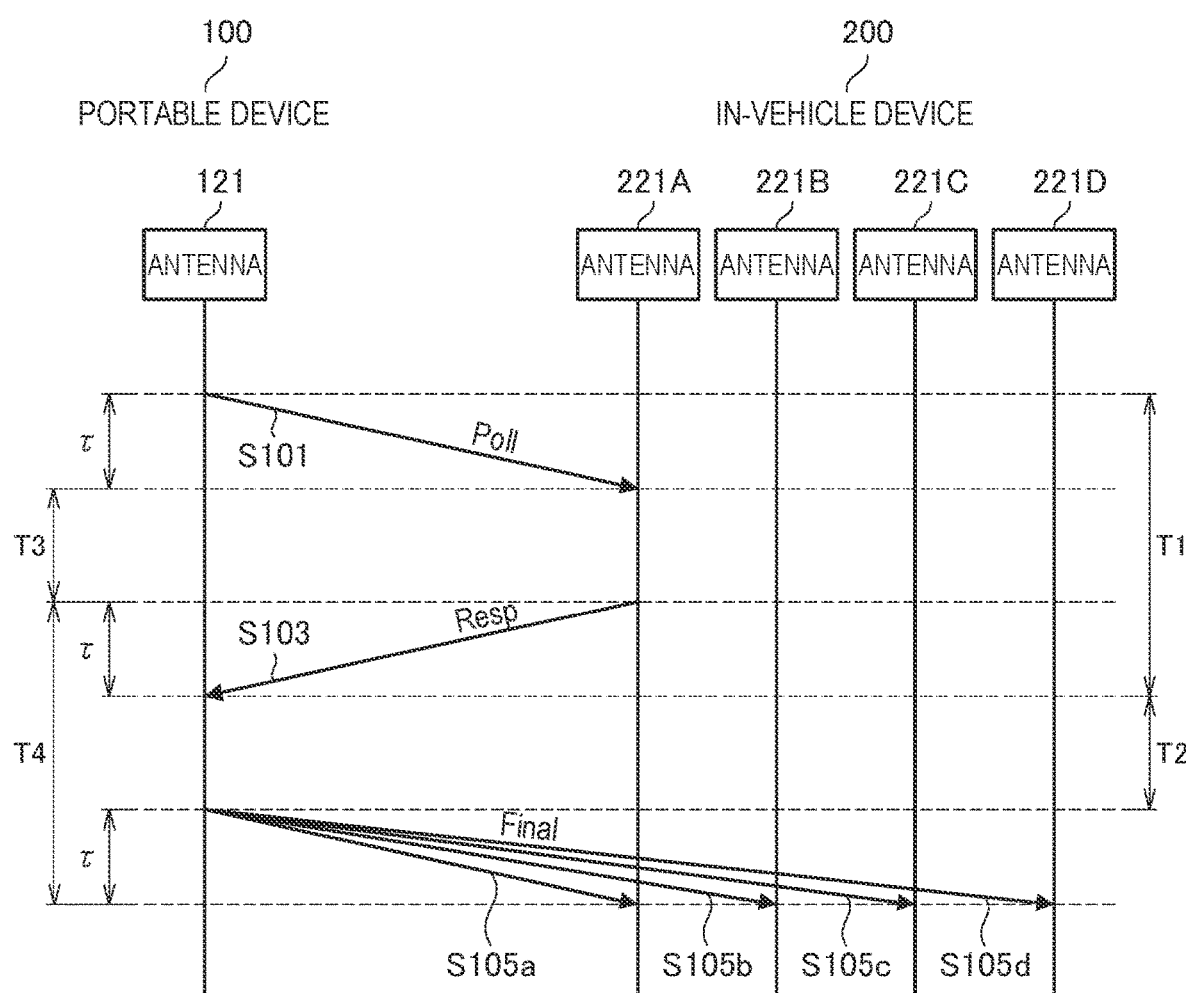
FIG. 5 is a diagram illustrating an example of a communication processing block of the communication unit 220 according to the present embodiment.

FIG. 5 is a sequence diagram for describing an example of a process related to positional relationship estimation between devices executed in the system 1 according to the present embodiment.

First, the antenna 121 of the portable device 100 transmits a Poll signal to the antenna 221A of the in-vehicle device 200 (S101).

Next, the antenna 221A of the in-vehicle device 200 transmits a Resp signal to the antenna 121 of the portable device 100 as a response to the Poll signal (S103).

The antenna 121 of the portable device 100 transmits a Final signal to the antenna 221A, the antenna 221B, the antenna 221C, and the antenna 221D of the in-vehicle device 200 as a response to the Resp signal (S105).

Here, a time length from the transmission of the Poll signal to the reception of the Resp signal by the portable device 100 is set as a time length T1, and a time length from the reception of the Resp signal to the transmission of the Final signal is set as a time length T2. A time length from the reception of the Poll signal to the transmission of the Resp signal by the in-vehicle device 200 is set as a time length T3, and a time length from the transmission of the Resp signal to the reception of the Final signal is set as a time length T4.

A distance between the portable device 100 and the in-vehicle device 200 may be calculated by using each of the above time lengths. For example, the in-vehicle device 200 may receive a signal including information regarding the time length T1 and the time length T2 from the portable device 100. The control device 300 may receive a signal including information regarding the time length T1, the time length T2, the time length T3, and the time length T4 from the in-vehicle device 200. The position estimation unit 325 calculates a signal propagation time $\tau$ by using the time length T1, the time length T2, the time length T3, and the time length T4. More specifically, the position estimation unit 325 may calculate the signal propagation time $\tau$ by using the following Equation 1.

$$T = (T1 \times T4 - T2 \times T3)/(T1 + T2 + T3 + T4) \quad (1)$$

The position estimation unit 325 may estimate a distance between the portable device 100 and the in-vehicle device 200 by multiplying the calculated signal propagation time $\tau$ by a known signal speed.

An example in which the position estimation unit 325 estimates the distance between the portable device 100 and the in-vehicle device 200 on the basis of a signal transmitted and received between the antenna 121 of the portable device 100 and the antenna 221A of the in-vehicle device 200 has been described, but the in-vehicle device 200 may transmit and receive a signal by using an antenna different from the antenna 221A, or may transmit and receive a signal by using a plurality of antennas 221.

The signal propagation time τ is not limited to a calculation method based on Equation 1. For example, the signal propagation time may also be calculated by subtracting the time length T3 from the time length T1 and dividing the time by 2.

Next, an arrival angle of a signal may be calculated from a phase difference of a Final signal received by an adjacent antenna among the plurality of antennas 221 of the in-vehicle device 200. For example, a phase of the Final signal received by the antenna 221A is set as a phase $P_A$, a phase of the Final signal received by the antenna 221B is set as a phase $P_B$, a phase of the Final signal received by the antenna 221C is set as a phase $P_C$, and a phase of the Final signal received by the antenna 221D is set as a phase $P_D$.

For example, a coordinate system is defined in which a straight line connecting the antenna 221A and the antenna 221B is an X axis, a straight line connecting the antenna 221A and the antenna 221C orthogonal to the X axis is a Y axis, and a vertical direction of the antenna 221A is the Z axis.

In the case of such a coordinate system, each of phase differences PdAB and $Pd_{CD}$ between the antennas adjacent to each other in the X-axis direction and phase differences $Pd_{AC}$ and $Pd_{BD}$ between the antennas adjacent to each other in the Y-axis direction are expressed by using the following Equation 2.

$$Pd_{AB}=(P_B-P_A)$$

$$Pd_{CD}=(P_D-P_C)$$

$$Pd_{AC}=(P_C-P_A)$$

$$Pd_{BD}=(P_D-P_B) \quad (2)$$

Here, an angle formed between the straight line connecting the antenna 221A and the antenna 221B (or the antenna 221C and the antenna 221D) and the first arrival wave will be referred to as a formed angle θ. An angle formed between the straight line connecting the antenna 221A and the antenna 221C (or the antenna 221B and the antenna 221D) and the first arrival wave will be referred to as a formed angle Φ. Here, each of the formed angle θ and the formed angle Φ are arrival angles of a signal, and are expressed by Equation 3. Here, λ is a wavelength of a radio wave and d is a distance between the antennas.

$$\Theta \text{ or } \Phi = \arccos(\lambda \times Pd/(2\pi d)) \quad (3)$$

Therefore, the position estimation unit 325 calculates an arrival angle of a signal by using Equation 4 on the basis of Equations 2 and 3.

$$\Theta_{AB}=\arccos(\lambda \times (P_B-P_A)/(2\pi d))$$

$$\Theta_{CD}=\arccos(\lambda \times (P_D-P_C)/(2\pi d))$$

$$\Phi_{CD}=\arccos(\lambda \times (P_C-P_A)/(2\pi d))$$

$$\Phi_{BD}=\arccos(\lambda \times (P_D-P_B)/(2\pi d))$$

The position estimation unit 325 may calculate the angle θ forming an average value of $\theta_{AB}$ and $\theta_{CD}$, or may estimate the angle θ forming either $\theta_{AB}$ or $\theta_{CD}$. Similarly, the position estimation unit 325 may calculate the angle Φ forming an average value of $\Phi_{AC}$ and $\Phi_{BD}$, or may estimate the angle Φ forming either $\Phi_{AC}$ or $\Phi_{BD}$.

The position estimation unit 325 may estimate a two-dimensional position or a three-dimensional position of the portable device 100 by using the estimated distance measurement value and the formed angle θ or the formed angle Φ.

For example, in the coordinate system described above, the position estimation unit 325 may estimate a three-dimensional position of the portable device 100 by using Equation 5.

$$X=R \times \cos\theta$$

$$Y=R \times \cos\Phi$$

$$Z=\sqrt{(R^2-x^2-y^2)} \quad (5)$$

As described above, the position estimation unit 325 may estimate a positional relationship between the portable device 100 and the in-vehicle device 200 on the basis of the signals transmitted and received between the plurality of antennas 221 of the in-vehicle device 200 and the antennas 121 of the portable device 100. On the other hand, as described above, the estimation accuracy of a positional relationship may be reduced depending on the multipath environment generated between the plurality of antennas 221 of the in-vehicle device 200 and the antennas 121 of the portable device 100.

Therefore, on the basis of a signal received by any of the antennas of the in-vehicle device 200 or the antenna 121 of the portable device 100, the position estimation unit 325 calculates a reliability parameter indicating the degree of whether or not signals transmitted and received between the plurality of antennas 221 of the in-vehicle device 200 and the antenna 121 of the portable device 100 are appropriate as processing targets for estimating a positional relationship. By using a signal for which the reliability parameter satisfies a predetermined criterion for estimating a positional relationship, the position estimation unit 325 can estimate a positional relationship between the portable device 100 and the in-vehicle device 200 with higher accuracy.

Hereinafter, a specific example of the reliability parameter calculated by the parameter calculation unit 321 will be described.

2.4. Reliability Parameter

The parameter calculation unit 321 according to the present embodiment calculates a reliability parameter on the basis of a signal received by the communication unit 220. Here, the received signal may be the above Poll signal, Resp signal, or Final signal, or may be a signal transmitted separately from the distance measurement signal from the portable device 100.

The reliability parameter is an index indicating the degree of whether or not a signal received by the antenna 121 of the communication unit 120 or any of the antennas 221 of the communication unit 220 is appropriate as a processing target for estimating a positional relationship between the portable device 100 and the in-vehicle device 200. For example, the reliability parameter is a continuous value or a discrete value, and as a value thereof increases, a signal transmitted and received by the antennas may become more appropriate as a processing target for estimating a positional relationship, and as the value decreases, the signal may become more inappropriate as a processing target for estimating a positional relationship. As a value of the reliability parameter increases, a signal transmitted and received by the antennas may become more inappropriate as a processing target for estimating a positional relationship, and as the value decreases, and the signal may become more appropriate as a processing target for estimating a positional relationship. Hereinafter, a reliability parameter based on a signal received by the communication unit 220 will be described with reference to specific examples.

Index Indicating Magnitude of Noise

The reliability parameter may be, for example, an index indicating a magnitude of noise. More specifically, the parameter calculation unit 321 may calculate the reliability parameter on the basis of at least one of a power value and a signal noise ratio (SNR) of a signal received by the communication unit 220. Since the influence of noise is small in a case where the power value or the SNR is large, a first reliability parameter indicating that the first arrival wave is appropriate as a detection target is calculated. On the other hand, since the influence of noise is large in a case where the power value or the SNR is small, a reliability parameter indicating that the first arrival wave is inappropriate as a detection target may be calculated.

Index Indicating Validity that First Arrival Wave is Based on Direct Wave

The reliability parameter is an index indicating the validity that the first arrival wave is based on a direct wave. The higher the validity that the first arrival wave is based on a direct wave, the higher the reliability, and the lower the validity that the first arrival wave is based on a direct wave, the lower the reliability.

For example, the reliability parameter may be calculated on the basis of the consistency between signals in each of the plurality of antennas 221 of the communication unit 220. More specifically, the parameter calculation unit 321 may calculate a reliability parameter on the basis of at least one of a signal reception time and a power value in each of the plurality of antennas 221 of the communication unit 220. Due to the influence of multipath, a plurality of signals arriving via different paths may be combined and received by the antennas in a state of being amplified or canceled out by each other. In a case where the way of amplifying and canceling out of a signal is different in each of the plurality of antennas, the reception time and the power value of the signal may be different among the plurality of antennas. Considering that a distance between the antennas is a short distance of about ½ of a wavelength of a signal for estimating an arrival angle, a large difference in a signal reception time and a power value between the antenna 221A, the antenna 221B, the antenna 221C, and the antenna 221D means that the validity that the signal is based on a direct wave becomes lower.

Therefore, a reliability parameter indicating that the validity that the first arrival wave is based on a direct wave becomes lower as a difference in the reception time of the first arrival wave (that is, a delay time of a specific element) between the plurality of antennas 221 becomes larger is calculated. On the other hand, a reliability parameter indicating that the validity that the first arrival wave is based on a direct wave becomes higher as a difference in the reception time of the first arrival wave between the plurality of antennas 221 becomes smaller is calculated. A reliability parameter indicating that the validity that the first arrival wave is based on a direct wave becomes lower as a difference in the power of the first arrival wave between the plurality of antennas 221 becomes larger is calculated. On the other hand, a reliability parameter indicating that the validity that the first arrival wave is based on a direct wave becomes higher as a difference in the power of the first arrival wave between the plurality of antennas 221 becomes smaller is calculated.

The reliability parameter may be calculated on the basis of the consistency between position parameters indicating a position where the portable device 100 is present and estimated on the basis of the first arrival wave received by each of a plurality of antenna pairs formed by two different antennas (for example, the antenna 221A and the antenna 221B) among the plurality of antennas 221. The position parameters here are the distance measurement value, the formed angles θ and Φ, and the coordinates (x,y,z). In a case where the first arrival wave is based on a direct wave, results of the formed angles θ and Φ and the coordinates (x,y,z) are the same or substantially the same even if combinations of antenna pairs of the communication unit 220 used for calculating the formed angles θ and Φ and the coordinates (x,y,z) are different. However, in a case where the first arrival wave is not based on a direct wave, there may be differences in results of the formed angles θ and Φ and the coordinates (x,y,z) in different antenna pairs of the communication unit 220.

Therefore, a reliability parameter indicating that the validity that the first arrival wave is based on a direct wave becomes higher as a difference in a calculation result of a position parameter between combinations of different antenna pairs becomes smaller is calculated. For example, a reliability parameter indicating that the validity that the first arrival wave is based on a direct wave becomes higher as an error between $\Phi_{AC}$ and $\Phi_{BD}$ and an error between $\theta_{AB}$ and $\theta_{CD}$ described in the angle estimation process are reduced is calculated. On the other hand, a reliability parameter indicating that the validity that the first arrival wave is based on a direct wave becomes lower as a difference in a calculation result of a position parameter between combinations of different antenna pairs becomes larger is calculated. For example, a reliability parameter indicating that the validity that the first arrival wave is based on a direct wave becomes lower as an error between $\Phi_{AC}$ and $\Phi_{BD}$ and an error between $\theta_{AB}$ and $\theta_{CD}$ described in the angle estimation process are increased is calculated. However, a reliability parameter calculated by using differences in the formed angles θ and Φ and the coordinates (x,y,z) is a reliability parameter for the entire antenna, and thus is not applied in Example 1 that will be described later.

Index Indicating Validity that First Arrival Wave is not Based on Composite Wave The reliability parameter may be an index indicating the validity that the first arrival wave is not based on a composite wave. The higher the validity that the first arrival wave is not based on a composite wave, the higher the reliability, and the lower the validity that the first arrival wave is not based on a composite wave, the lower the reliability. Specifically, the reliability parameter may be calculated on the basis of at least one of a width of the first arrival wave in the time direction and a phase state in the first arrival wave.

Index Indicating Validity of Situation in which Wireless Signal is Received

The reliability parameter may be an index indicating the validity of a situation in which a wireless signal is received. The higher the validity of a situation in which a wireless signal is received, the higher the reliability, and the lower the validity of the situation in which the wireless signal is received, the lower the reliability.

For example, the reliability parameter may be calculated on the basis of a variation of a plurality of first arrival waves. In this case, the reliability parameter may be calculated on the basis of a statistic indicating a variation of a plurality of first arrival waves, such as a variance of power values of the first arrival waves, and variances and amounts of change of the estimated position parameters (the distance, the formed angles θ and Φ, and the coordinates (x,y,z)).

Difference Between Delay Time of First Element and Delay Time of Second Element

The reliability parameter may be a difference between a delay time of a first element in which a CIR value peaks first after a specific element in CIR and a delay time of a second element in which the CIR value peaks second after the specific element. As shown in FIG. 4, a CIR waveform of the first arrival wave is a waveform having one peak. On the other hand, when a composite wave is detected as the first arrival wave, a CIR waveform of the first arrival wave may be a waveform including a plurality of peaks. Whether the CIR waveform of the first arrival wave has one peak or a plurality of peaks may be determined on the basis of a difference between the delay time of the first element and the delay time of the second element.

In a case where a composite wave is detected as the first arrival wave, the estimation accuracy of a position parameter is lower than in a case where a direct wave is detected as the first arrival wave. Therefore, it can be said that the larger the difference between the delay time of the first element and the delay time of the second element, the higher the reliability.

Correlation of CIR Waveform

The reliability parameter may be derived on the basis of a correlation of a CIR waveform in a certain antenna pair among the plurality of antennas 221 of the communication unit 220. In a case where a direct wave and a delayed wave are received in a combined state in the plurality of antennas 221 of the communication unit 220, a phase relationship between the direct wave and the delayed wave may be different between antennas even if the distance between the antennas is short. As a result, CIR waveforms in the respective antennas may be different. That is, the fact that the CIR waveforms differ in a certain antenna pair means that a composite wave is received in at least one of the antenna pairs. In a case where a composite wave is detected as the first arrival wave, that is, in a case where a specific element corresponding to a direct wave is not detected, the estimation accuracy of a position parameter is reduced.

For example, the reliability parameter may be a correlation coefficient between a CIR obtained on the basis of a received signal received from one antenna and a CIR obtained on the basis of a received signal received by another antenna among the plurality of antennas 221 of the communication unit 220. In this case, the reliability parameter is determined to be less reliable as the correlation coefficient becomes smaller, and is determined to be more reliable as the correlation coefficient becomes larger. The correlation coefficient includes, for example, a Pearson's correlation coefficient.

Supplement

Hereinafter, a supplement relating to a specific example of the reliability parameter described below will be described.

First, each of a plurality of sampling points included in a CIR will also be referred to as an element below. That is, the CIR includes a CIR value for each delay time as an element. A shape of the CIR, more specifically, a shape of a time-series change of the CIR value will also be referred to as a CIR waveform.

Among a plurality of elements included in the CIR, a specific element will also be referred to as a specific element below. The specific element is an element corresponding to the first arrival wave. The specific element is detected according to the predetermined detection criterion described above for the first arrival wave. As an example, the specific element is an element of which an amplitude or power as a CIR value first exceeds a predetermined threshold value among a plurality of elements included in the CIR. Hereinafter, such a predetermined threshold value will also be referred to as a fast path threshold value.

The time corresponding to a delay time of the specific element is used for measuring a distance as a reception time of the first arrival wave. A phase of the specific element is used for estimating an arrival angle of a signal as a phase of the first arrival wave.

The plurality of antennas 221 of the communication unit 220 may include the communication unit 220 in a line of sight (LOS) state and the communication unit 220 in a non-line of sight (NLOS) state.

The LOS state means that a space between the antenna 221 of the in-vehicle device 200 and the antenna 121 of the portable device 100 can be seen. In the LOS state, the reception power of a direct wave is the largest, and thus a reception side is likely to succeed in detecting the direct wave as the first arrival wave.

The NLOS state means that the antenna 221 of the in-vehicle device 200 and the antenna 121 of the portable device 100 cannot be seen. In the NLOS state, the reception power of a direct wave may be smaller than the others, and thus a reception side may fail to detect the direct wave as the first arrival wave.

In a case where the communication unit 220 is in the NLOS state, the reception power of a direct wave among signals arriving from the portable device 100 becomes smaller than that of noise. Therefore, even if the direct wave is successfully detected as the first arrival wave, A phase and reception time of the first arrival wave may vary due to the influence of noise. In that case, the distance measurement accuracy and the arrival angle estimation accuracy may decrease.

In a case where the communication unit 220 is in the NLOS state, the reception power of a direct wave is smaller than in a case where the communication unit 220 is in the LOS state, and it may fail to detect the direct wave as the first arrival wave. In that case, the distance measurement accuracy and the arrival angle estimation accuracy may decrease.

Difference Between Delay Time of Specific Element and Delay Time of Element Having Maximum CIR Value Therefore, the reliability parameter may be a difference between a delay time of the specific element and a delay time of an element having the maximum CIR value in the CIR.

If the communication unit 220 is in the LOS state, a CIR value of a direct wave is the largest. Therefore, an element having the maximum CIR value in the CIR is included in a set corresponding to the direct wave.

On the other hand, in the NLOS state, a CIR value of a delayed wave may be greater than a CIR value of a direct wave. This is because in the NLOS state, there is a shield in the middle of the fast path. In particular, if there is a human body in the middle of the fast path, a direct wave is greatly attenuated when the direct wave passes through the human body. In that case, an element having the maximum CIR value in the CIR is not included in the set corresponding to the direct wave.

Whether the communication unit 220 is in the LOS state or the NLOS state may be determined on the basis of a difference between the delay time of the specific element and the delay time of the element having the maximum CIR value in the CIR.

This is because the difference may be small in a case where the communication unit 220 is in the LOS state. This is because the difference may be large in a case where the communication unit 220 is in the NLOS state.

The specific example of the reliability parameter according to the present embodiment has been described above. The position estimation unit 325 can improve the estimation accuracy of a positional relationship between the portable device 100 and the in-vehicle device 200 by using a reliability parameter calculated by the parameter calculation unit 321.

The position estimation unit 325 may use a distance measurement value as a reliability parameter in addition to the above reliability parameter, or may use a plurality of reliability parameters in combination. Hereinafter, specific examples using a reliability parameter will be sequentially described.

3. Examples

3.1. Example 1

The control unit 320 related to Example 1 may perform control for estimating a positional relationship between the portable device 100 and the in-vehicle device 200 by applying a weight parameter based on a reliability parameter calculated on the basis of a signal received from the portable device 100 by the in-vehicle device 200 to a phase difference between adjacent antennas of the plurality of antennas 221 of the in-vehicle device 200.

Here, the adjacent antennas refer to the antenna 221A and the antenna 221B, the antenna 221C and the antenna 221D, the antenna 221A and the antenna 221C, and the antenna 221B and the antenna 221D, shown in FIG. 2.

The control unit 320 may perform weighted averaging based on a weight parameter on a phase difference between antennas in directions parallel to each other among the plurality of antennas 221 and perform control for estimating a positional relationship between the portable device 100 and the in-vehicle device 200. The antennas in the parallel direction are an antenna pair including the antenna 221A and the antenna 221B parallel to the X-axis described above, and an antenna pair including the antenna 221C and the antenna 221D. The antennas in the parallel direction are an antenna pair including the antenna 221A and the antenna 221C parallel to the Y axis described above, and an antenna pair including the antenna 221B and the antenna 221D.

For example, a phase difference between antennas after weighted averaging for each antenna pair parallel to the X axis is set as an inter-antenna phase difference $Pd_X$, and a phase difference between antennas after weighted averaging for each antenna pair parallel to the Y axis is set as an inter-antenna phase difference $Pd_Y$. A weight parameter for an inter-antenna phase difference $Pd_{AB}$ of the antenna 221A and the antenna 221B is set as a weight parameter $W_{AB}$, a weight parameter for an inter-antenna phase difference $Pd_{CD}$ of the antenna 221C and the antenna 221D is set as a weight parameter $W_{CD}$, a weight parameter for an inter-antenna phase difference $Pd_{AC}$ of the antenna 221A and the antenna 221C is set as a weight parameter $W_{AC}$, and a weight parameter for an inter-antenna phase difference $Pd_{BD}$ of the antenna 221B and the antenna 221D is set as a weight parameter $W_{BD}$.

Here, the parameter calculation unit 321 may set, for example, values indicated by reliability parameters as the weight parameters $W_{AB}$, $W_{CD}$, $W_{AC}$, and $W_{BD}$. For example, in a case where the reliability parameter is the above reception power, when the reception power of a signal received by the antenna 221A is "−90 dBm" and the reception power of a signal received by the antenna 221B is "−100 dBm", the weight parameter $W_{AB}$ may be "−95 dBm" which is an average value of "−90 dBm" and "−100 dBm". Alternatively, the weight parameter $W_{AB}$ may be "−90 dBm", which is the maximum value of "−90 dBm" and "−100 dBm", or "−100 dBm", which is the minimum value. Alternatively, the weight parameter $W_{AB}$ may be a median value of the reception power of the plurality of antennas 221.

The position estimation unit 325 may estimate the inter-antenna phase difference $Pd_X$ in the X-axis direction and the inter-antenna phase difference $Pd_Y$ in the Y-axis direction by using Equation 6.

$$Pd_X=(W_{AB}\times Pd_{AB}+W_{CD}\times Pd_{CD})/(W_{AB}+W_{CD})$$

$$Pd_Y=(W_{AC}\times Pd_{AC}+W_{BD}\times Pd_{BD})/(W_{AC}+W_{BD}) \quad (6)$$

The position estimation unit 325 calculates the formed angle θ on the basis of the $Pd_X$ estimated by using Equation 6 and Equation 3, and calculates the formed angle Φ on the basis of $Pd_Y$ estimated by using Equation 6 and Equation 3. As a result, the position estimation unit 325 can estimate a positional relationship between the portable device 100 and the in-vehicle device 200 with higher accuracy.

In the example described above, an example in which the parameter calculation unit 321 sets a value indicated by a reliability parameter as a weight parameter has been described, but a weight parameter is not limited to the above example. Hereinafter, another example of a method of calculating a weight parameter in the parameter calculation unit 321 will be described with reference to FIGS. 6A to 7D. First, with reference to FIGS. 6A to 6D, a specific example of a method of calculating a weight parameter in a case where the reliability becomes higher as a value of the reliability parameter becomes smaller will be described. In the following description, a method of calculating a weight parameter on the basis of a reliability parameter of the antenna pair of the antenna 221A and the antenna 221B will be described.

Figure 6A:
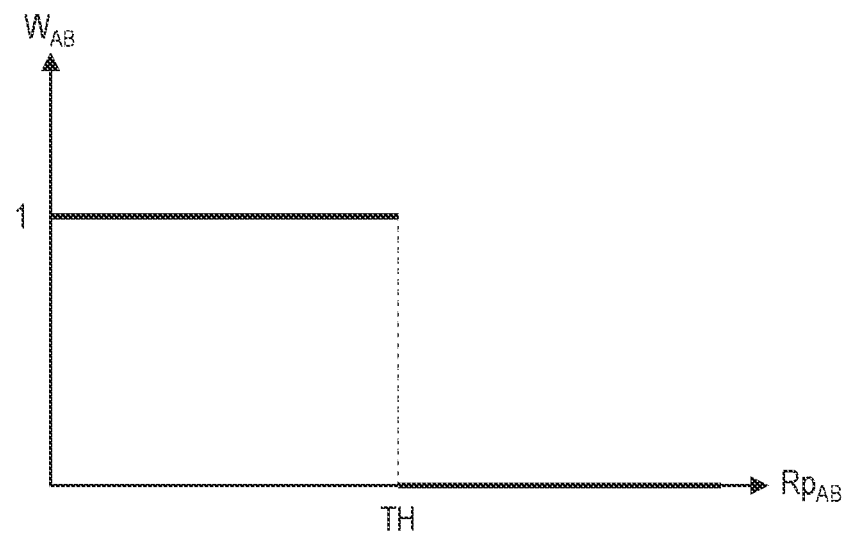
FIG. 6A is an explanatory diagram for describing an example of a weight parameter calculation method according to a first specified value.

FIG. 6A is an explanatory diagram for describing an example of a method of calculating a weight parameter according to a first specified value. The parameter calculation unit 321 may calculate a weight parameter W on the basis of, for example, a reliability parameter Rp and Equation 7.

$$W=1 (Rp<TH)$$

$$W=0 (Rp\geq TH) \quad (7)$$

For example, the parameter calculation unit 321 may calculate a first value when the reliability parameter $Rp_{AB}$ is equal to or more than the specified value TH, and calculate a second value when the reliability parameter $Rp_{AB}$ is less than the specified value TH.

The first value may be, for example, "0" as shown in FIG. 6A. The second value may be, for example, "1" as shown in FIG. 6A. However, the first value and the second value may be any values as long as the first value is smaller than the second value. Consequently, the parameter calculation unit 321 can set a weight parameter according to a simpler calculation method.

The parameter calculation unit 321 may calculate the first value when the reliability parameter Rp is equal to or more than a first specified value, and calculate the second value when the reliability parameter Rp is less than a second specified value smaller than the first specified value. The parameter calculation unit 321 may calculate a third value by using a specified function when the reliability parameter Rp is equal to or more than the second specified value and less than the first specified value. Here, the specified function may be, for example, a monotonic increase or monotonic decrease function. In this case, when the smaller the reliability parameter, the higher the reliability, the specified function is a monotonic decrease function, and when the larger the reliability parameter, the higher the reliability, the specified function is a monotonic increase function. First, with reference to FIGS. 6B to 6D, a specific example of a method of calculating a weight parameter when the specified function is a monotonic decrease function will be described.

Figure 6B:
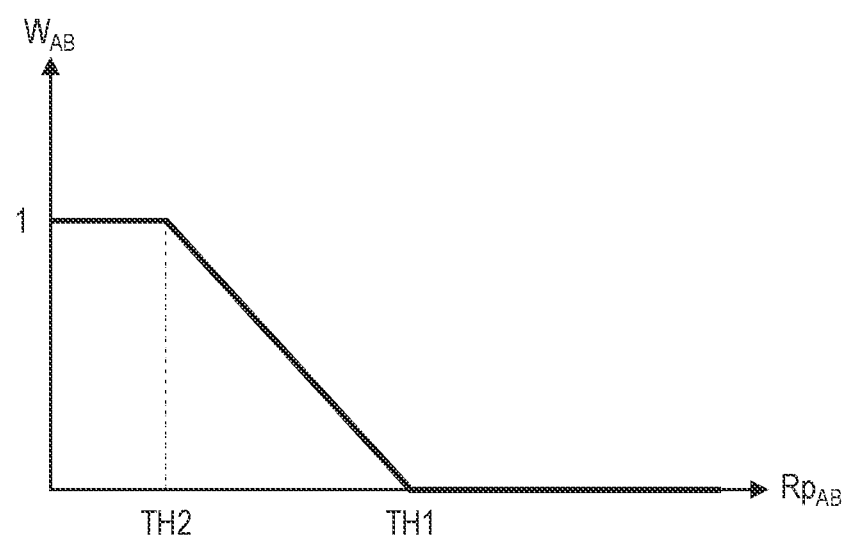
FIG. 6B is an explanatory diagram for describing an example of a weight parameter calculation method using a linear function as a specified function.

FIG. 6B is an explanatory diagram for describing an example of a weight parameter calculation method using a linear function as a specified function. The parameter calculation unit 321 may calculate the weight parameter W on the basis of the reliability parameter Rp and Equation 8.

$$W=1 (Rp<TH2)$$

$$W=-(Rp_{AB}-TH2)/(TH1-TH2)+1 (TH2 \leq Rp<TH1)$$

$$W=0 (Rp \geq TH1) \quad (8)$$

The parameter calculation unit 321 calculates "0" as the first value when the reliability parameter $Rp_{AB}$ is equal to or more than the first specified value TH1, and calculates "1" as the second value when the reliability parameter $Rp_{AB}$ is less than the second specified value. The parameter calculation unit 321 may calculate the third value by using a linear function as the specified function when the reliability parameter $Rp_{AB}$ is equal to or more than the second specified value TH2 and less than the first specified value TH1.

Figure 6C:
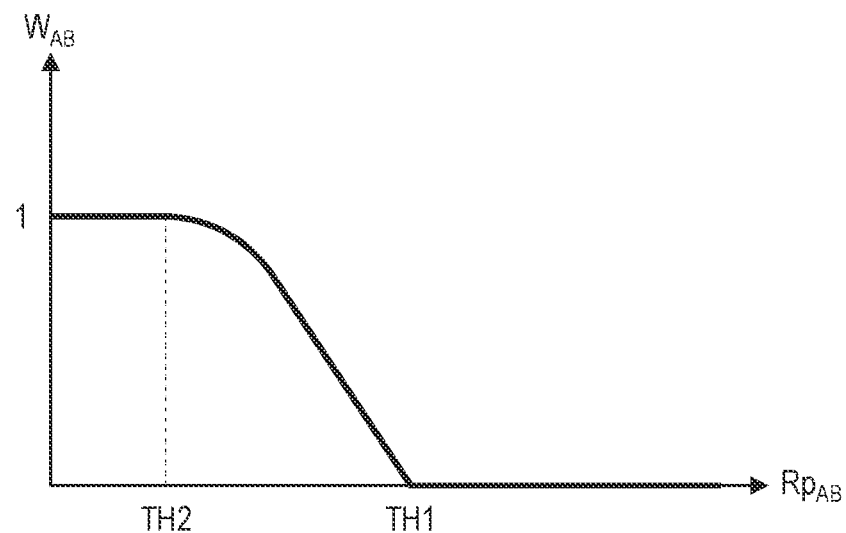
FIG. 6C is an explanatory diagram for describing an example of a weight parameter calculation method using a trigonometric function as a specified function.

FIG. 6C is an explanatory diagram for describing an example of a weight parameter calculation method using a trigonometric function as a specified function. The parameter calculation unit 321 may calculate the weight parameter W on the basis of the reliability parameter Rp and Equation 9.

$$W=1 (Rp<TH2)$$

$$W=\cos [(Rp_{AB}-TH2)/(TH1-TH2) \times \pi/2]$$
$$(TH2=Rp<TH1)$$

$$W=0 (Rp \geq TH1) \quad (9)$$

The parameter calculation unit 321 calculates "0" as the first value when the reliability parameter $Rp_{AB}$ is equal to or more than the first specified value TH1, and calculates "1" as the second value when the reliability parameter $Rp_{AB}$ is less than the second specified value. The parameter calculation unit 321 may calculate the third value by using a trigonometric function as the specified function when the reliability parameter $Rp_{AB}$ is equal to or more than the second specified value TH2 and less than the first specified value TH1.

Figure 6D:
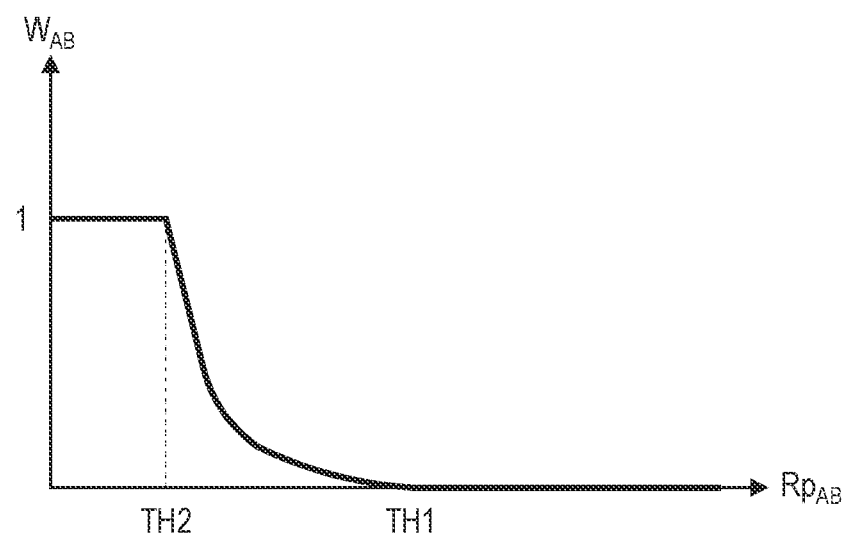
FIG. 6D is an explanatory diagram for describing an example of a weight parameter calculation method using an exponential function as a specified function.

FIG. 6D is an explanatory diagram for describing an example of a weight parameter calculation method using an exponential function as a specified function. The parameter calculation unit 321 may calculate the weight parameter W on the basis of the reliability parameter Rp and Equation 10.

$$W=1 (Rp<TH2)$$

$$W=\exp[-5 \times (Rp_{AB}-TH2)/(TH1-TH2)] (TH2 \leq Rp<TH1)$$

$$W=0 (Rp \geq TH1) \quad (10)$$

The parameter calculation unit 321 calculates "0" as the first value when the reliability parameter $Rp_{AB}$ is equal to or more than the first specified value TH1, and calculates "1" as the second value when the reliability parameter $Rp_{AB}$ is less than the second specified value. The parameter calculation unit 321 may calculate the third value by using an exponential function as the specified function when the reliability parameter $Rp_{AB}$ is equal to or more than the second specified value TH2 and less than the first specified value TH1.

The specific example of the weight parameter calculation method in the case where the reliability becomes higher as the reliability parameter Rp becomes smaller has been described above. Subsequently, with reference to FIG. 7, a specific example of a method for calculating a weight parameter in a case where the reliability becomes higher as the reliability parameter Rp becomes larger will be described.

Figure 7A:
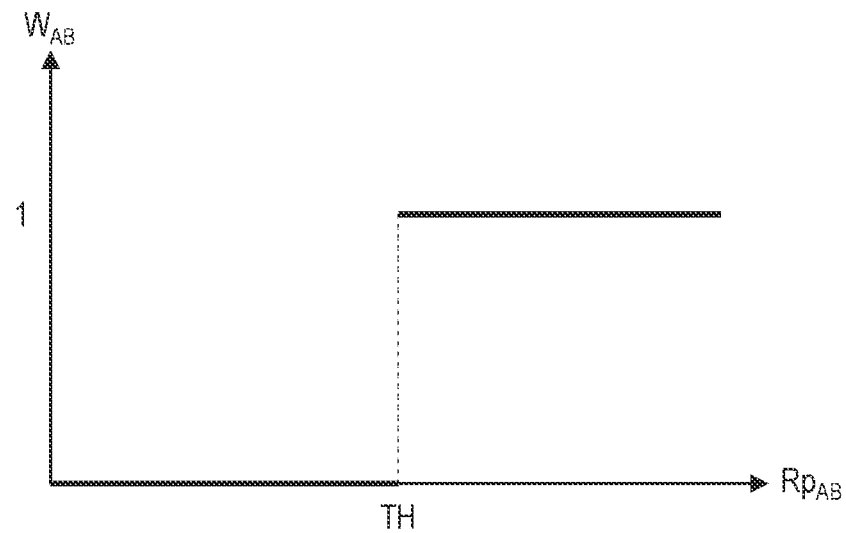
FIG. 7A is an explanatory diagram for describing an example of a weight parameter calculation method according to the first specified value.

FIG. 7A is an explanatory diagram for describing an example of a method of calculating a weight parameter according to the first specified value. The parameter calculation unit 321 may calculate the weight parameter W on the basis of the reliability parameter Rp and Equation 11.

$$W=0 (Rp<TH)$$

$$W=1 (Rp \geq TH) \quad (11)$$

Similar to Equation 7, the parameter calculation unit 321 may calculate a first value when the reliability parameter $Rp_{AB}$ is equal to or more than the specified value TH, and calculate a second value when the reliability parameter $Rp_{AB}$ is less than the specified value TH.

In Equation 7, the first value may be any value as long as the first value is smaller than the second value, but in Equation 11, the first value is any value as long as the first value is greater than the second value. The first value may be, for example, "1" as shown in FIG. 7A. The second value may be, for example, "0" as shown in FIG. 7A.

That is, in a case where the reliability becomes higher as the reliability parameter becomes larger, the magnitude relationship between the first value and the second value described in the case where the reliability becomes higher as the reliability parameter becomes smaller is exchanged. A specific example of a method of calculating a weight parameter when the specified function is a monotonic increase function will be described with reference to FIGS. 7B to 7D below, and repeated description of FIGS. 6B to 6D will be omitted.

Figure 7B:
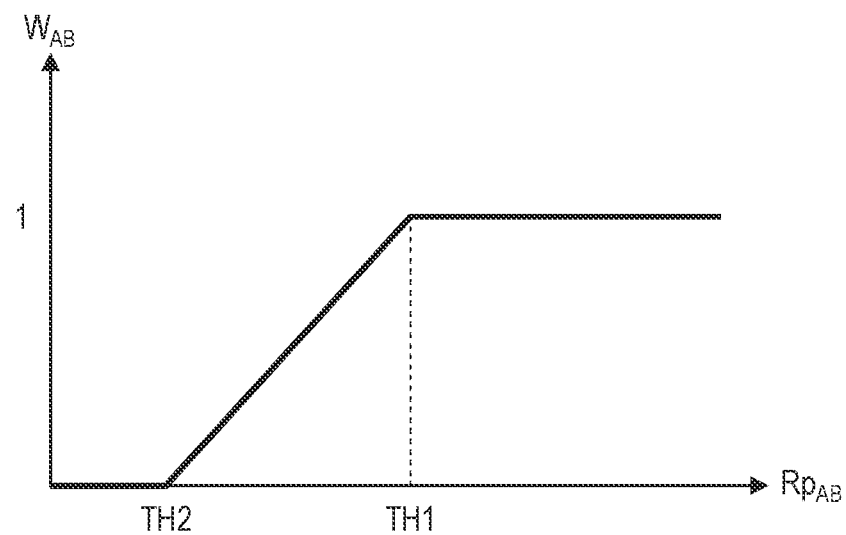
FIG. 7B is an explanatory diagram for describing an example of a weight parameter calculation method using a linear function as a specified function.

FIG. 7B is an explanatory diagram for describing an example of a weight parameter calculation method using a linear function as a specified function. The parameter calculation unit 321 may calculate the weight parameter W on the basis of the reliability parameter Rp and Equation 12.

$$W=0 (Rp<TH2)$$

$$W=-(Rp_{AB}-TH2)/(TH1-TH2)+1 (TH2 \leq Rp<TH1)$$

$$W=1 (Rp \geq TH1) \quad (12)$$

Figure 7C:
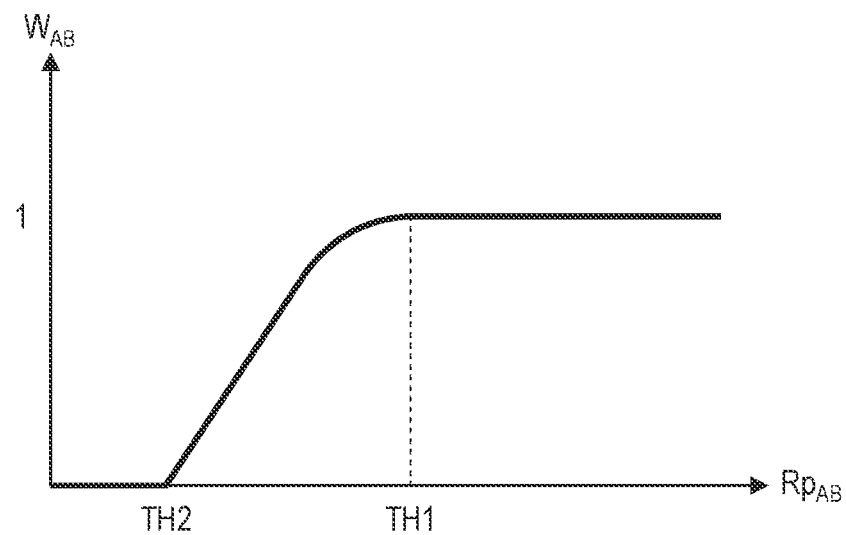
FIG. 7C is an explanatory diagram for describing an example of a weight parameter calculation method using a trigonometric function as a specified function.

FIG. 7C is an explanatory diagram for describing an example of a weight parameter calculation method using a trigonometric function as a specified function. The parameter calculation unit 321 may calculate the weight parameter W on the basis of the reliability parameter Rp and Equation 13.

$$W=0 (Rp<TH2)$$

$$W=\sin [(Rp_{AB}-TH2)/(TH1-TH2) \times \pi/2]$$
$$(TH2 \leq Rp<TH1)$$

$$W=1 (Rp \geq TH1) \quad (13)$$

Figure 7D:
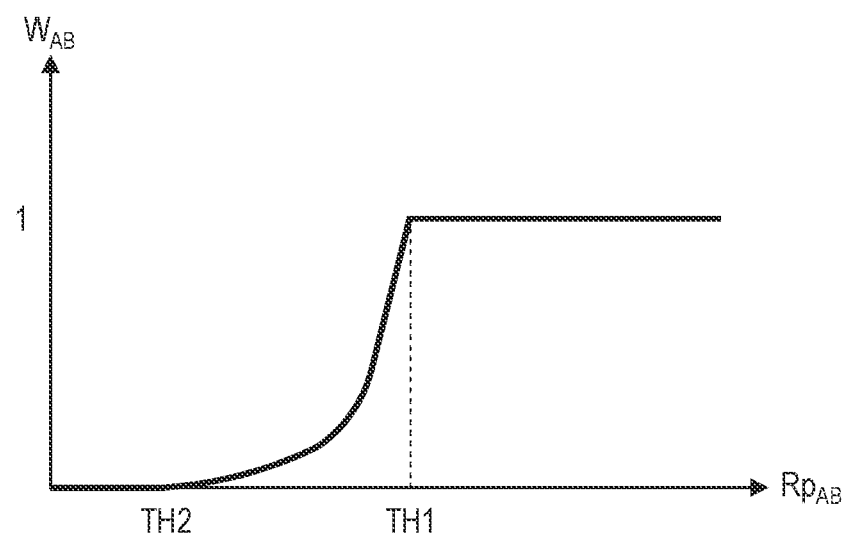
FIG. 7D is an explanatory diagram for describing an example of a weight parameter calculation method using an exponential function as a specified function.

FIG. 7D is an explanatory diagram for describing an example of a weight parameter calculation method using an exponential function as a specified function. The parameter calculation unit 321 may calculate the weight parameter Won the basis of the reliability parameter Rp and Equation 14.

$$W=0 (Rp<TH2)$$

$$W=\exp[5\times(Rp_{AB}-TH2)/(TH1-TH2)-1]$$
$$(TH2 \leq Rp<TH1)$$

$$W=1 (Rp \geq TH1) \qquad (12)$$

The parameter calculation unit 321 calculates a weight parameter by using at least one of the specific examples related to the weight parameter calculation method for each antenna pair. The position estimation unit 325 calculates the inter-antenna phase difference $Pd_X$ in the X-axis direction and the inter-antenna phase difference $Pd_Y$ in the Y-axis direction on the basis of the calculated weight parameter and Equation 6. The position estimation unit 325 calculates the formed angle θ and the formed angle Φ of a signal as arrival angles of the signal on the basis of each of the inter-antenna phase differences $Pd_X$ and $Pd_Y$ calculated by applying the weight parameter and Equation 3. Consequently, the position estimation unit 325 can reduce the influence of the multipath environment and calculate the arrival angle of the signal with higher accuracy.

Example of Operation Process

Figure 8:
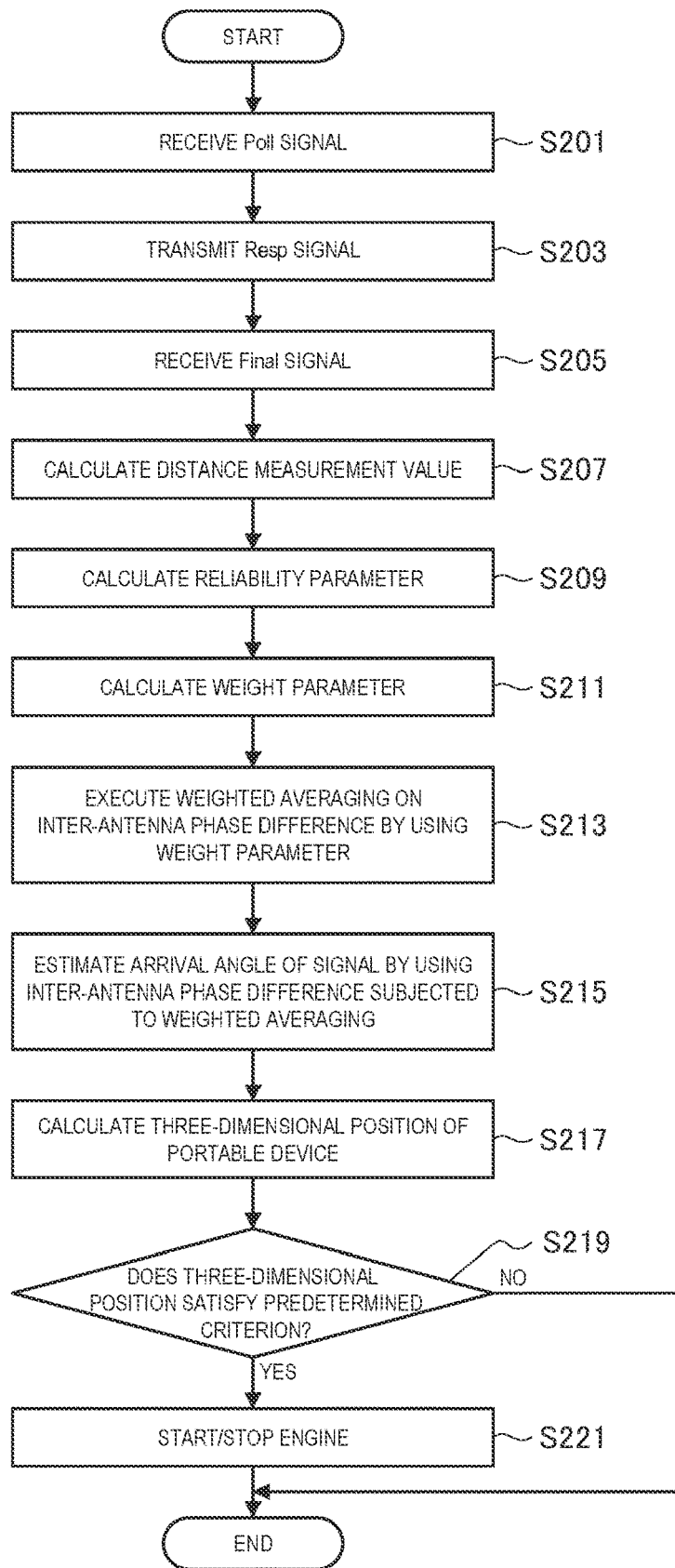
FIG. 8 is an explanatory diagram for describing an example of an operation process of the system 1 related to Example 1.

FIG. 8 is an explanatory diagram for describing an example of an operation process of the system 1 related to Example 1. First, the communication unit 120 included in the portable device 100 transmits a Poll signal, and the communication unit 220 included in the in-vehicle device 200 receives the Poll signal (S201).

Subsequently, the communication unit 220 transmits a Resp signal as a response to the Poll signal, and the communication unit 120 receives the Resp signal (S203).

The communication unit 120 transmits a Final signal as a response to the Resp signal, and the communication unit 220 receives the Final signal (S205). Here, the communication unit 220 transmits various types of information regarding the signals transmitted and received to and from the communication unit 120 to the communication unit 310 included in the control device 300.

Subsequently, the position estimation unit 325 calculates ae distance measurement value on the basis of the signals transmitted and received between the portable device 100 and the in-vehicle device (S207).

Subsequently, the parameter calculation unit 321 calculates a reliability parameter on the basis of the signals received by the in-vehicle device 200 (S209).

The parameter calculation unit 321 calculates a weight parameter on the basis of the calculated reliability parameter (S211).

The position estimation unit 325 performs weighted averaging on each of inter-antenna phase differences by using the weight parameter calculated by the parameter calculation unit 321 (S213).

Subsequently, the position estimation unit 325 estimates an arrival angle of the signal received from the portable device 100 by using the inter-antenna phase difference subjected to the weighted averaging (S215).

The position estimation unit 325 calculates a three-dimensional position of the portable device 100 on the basis of the estimated arrival angle of the signal and the distance measurement value (S217).

The control unit 320 determines whether or not the three-dimensional position of the portable device 100 calculated by the position estimation unit 325 satisfies a predetermined criterion (S219). In a case where the predetermined criterion is satisfied (S219: Yes), the control unit 320 causes the process to proceed to S221, and in a case where the predetermined criterion is not satisfied (S219: No), the control unit 320 ends the process.

In a case where a predetermined criterion is satisfied (S219: Yes), the control unit 320 performs operation control related to starting or stopping an engine, which is an example of the operation device 400 (S221), and the control unit 320 ends the process.

The control example related to Example 1 has been described above. According to the control related to Example 1, the control device 300 makes it possible to reduce the influence of the multipath, and can estimate a positional relationship between the portable device 100 and the in-vehicle device 200 with higher accuracy. Subsequently, Example 2 will be described with reference to FIGS. 9 to 11.

3.2. Example 2

The control unit 320 related to Example 2 performs control for estimating a positional relationship between the portable device 100 and the in-vehicle device 200 by applying a weight parameter based on a reliability parameter calculated on the basis of a signal received by the in-vehicle device 200 from the portable device 100 to at least two provisional positional relationships estimated on the basis of signals transmitted and received between the in-vehicle device 200 and the portable device 100.

For example, the position estimation unit 325 related to Example 2 estimates a provisional positional relationship between the portable device 100 and the in-vehicle device 200 on the basis of signals transmitted and received by each of the antenna 221A, the antenna 221B, and the antenna 221C, and the portable device 100 as shown in FIG. 2. The position estimation unit 325 related to Example 2 estimates a provisional positional relationship between the portable device 100 and the in-vehicle device 200 on the basis of signals transmitted and received by each of the antenna 221A, the antenna 221C, and the antenna 221D, and the portable device 100 as shown in FIG. 2. The position estimation unit 325 related to Example 2 estimates a provisional positional relationship between the portable device 100 and the in-vehicle device 200 on the basis of signals transmitted and received by each of the antenna 221B, the antenna 221C, and the antenna 221D, and the portable device 100 as shown in FIG. 2.

The parameter calculation unit 321 calculates a reliability parameter based on a signal received by the portable device 100 for each antenna or antenna pair of the in-vehicle device 200. The parameter calculation unit 321 calculates a weight parameter on the basis of a calculated reliability parameter by using any of the methods described in Example 1.

In a case where three provisional positional relationships are estimated as described above, the position estimation unit 325 related to Example 2 may apply the above weight parameter to the three provisional positional relationships, to estimate a positional relationship between the portable device 100 and the in-vehicle device 200.

Although the case where three provisional positional relationships are estimated has been described, any number of provisional positional relationships may be estimated as long as at least two provisional positional relationships are estimated. As long as the number of antennas included in the in-vehicle device 200 is at least three, a method of estimating a positional relationship between the portable device 100 and the in-vehicle device 200 related to Example 2 can be applied.

Example 1, Example 2, and Example 3 are also applicable in a case where a plurality of in-vehicle devices 200 are mounted on the vehicle 20. Hereinafter, a case where two in-vehicle devices 200 are mounted on the vehicle 20 related to Example 2 and Example 3 will be described.

Figure 9:
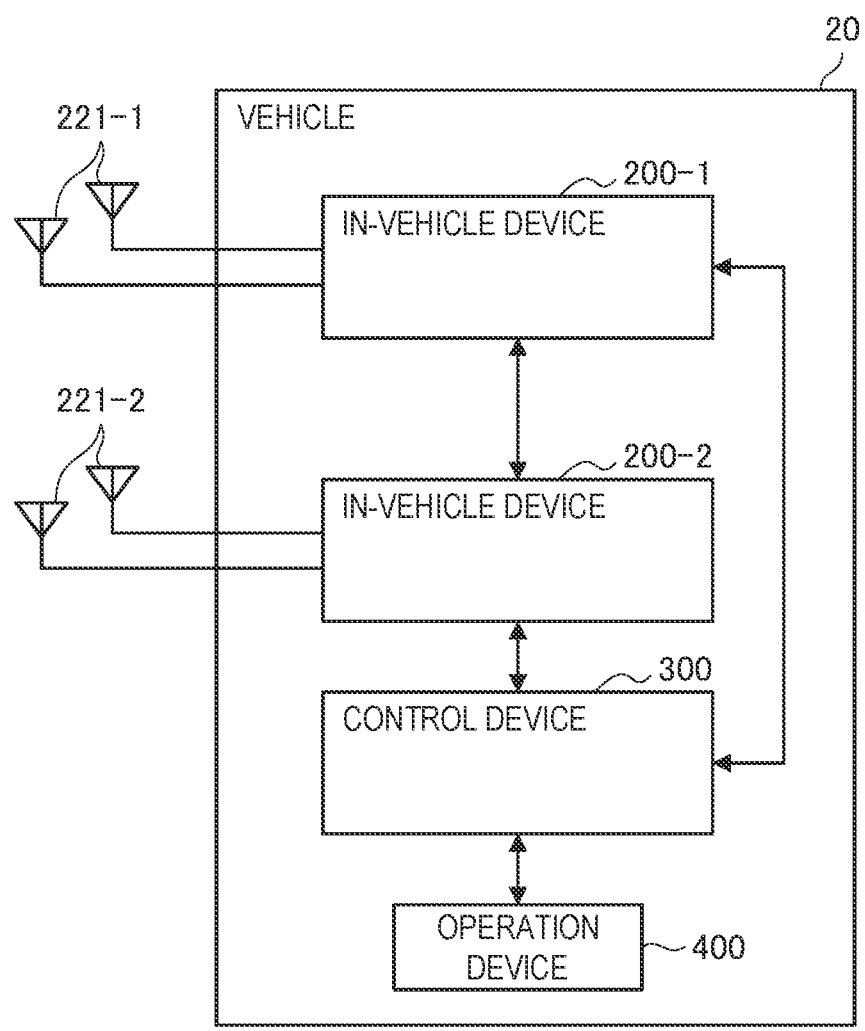
FIG. 9 is a block diagram illustrating a configuration example of a vehicle 20 related to Example 2 and Example 3.

FIG. 9 is a block diagram illustrating a configuration example of the vehicle 20 related to Example 2 and Example 3. As shown in FIG. 9, the vehicle 20 is equipped with an in-vehicle device 200-1 and an in-vehicle device 200-2. The vehicle 20 may be equipped with three or more in-vehicle devices 200. Since functional configuration examples of the in-vehicle device 200, the control device 300, and the operation device 400 are the same as those described with reference to FIG. 1, the description thereof will be omitted.

The control unit 320 related to Example 2 may perform control for estimating a positional relationship between the portable device 100 and the in-vehicle device 200 by applying a weight parameter based on a reliability parameter calculated on the basis of a signal received from the portable device 100 by each of the plurality of in-vehicle devices 200 to a provisional positional relationship between the portable device 100 and the in-vehicle device 200 estimated on the basis of a signal transmitted and received between each of the plurality of in-vehicle devices 200 and the portable device 100.

First, signals are transmitted and received between the portable device 100 and the in-vehicle device 200-1 and the in-vehicle device 200-2, and the control device 300 acquires information regarding the signals transmitted and received from the in-vehicle device 200-1 and the in-vehicle device 200-2.

The parameter calculation unit 321 calculates a reliability parameter on the basis of the signal received from the portable device 100 by the in-vehicle device 200-1. The parameter calculation unit 321 calculates a weight parameter on the basis of the calculated reliability parameter by using any of the methods described in Example 1.

The parameter calculation unit 321 calculates a reliability parameter on the basis of the signal received from the portable device 100 by the in-vehicle device 200-2. The parameter calculation unit 321 calculates the weight parameter on the basis of the calculated reliability parameter by using any of the methods described in Example 1.

Subsequently, the position estimation unit 325 estimates an arrival angle of the signal and a three-dimensional position of the portable device 100 on the basis of the signal transmitted and received between the portable device 100 and the in-vehicle device 200-1. The position estimation unit 325 estimates an arrival angle of the signal and a three-dimensional position of the portable device 100 on the basis of the signal transmitted and received between the portable device 100 and the in-vehicle device 200-2. The signal arrival angle or the three-dimensional position of the portable device 100 estimated for each in-vehicle device 200 is a specific example of a provisional positional relationship between the portable device 100 and the in-vehicle device 200.

The position estimation unit 325 estimates a positional relationship between the portable device 100 and the in-vehicle device 200 by applying the weight parameter calculated by the parameter calculation unit 321 to the estimated provisional positional relationship between the portable device 100 and the in-vehicle device 200. Hereinafter, a specific example of Example 2 will be described with reference to FIG. 10.

Figure 10:
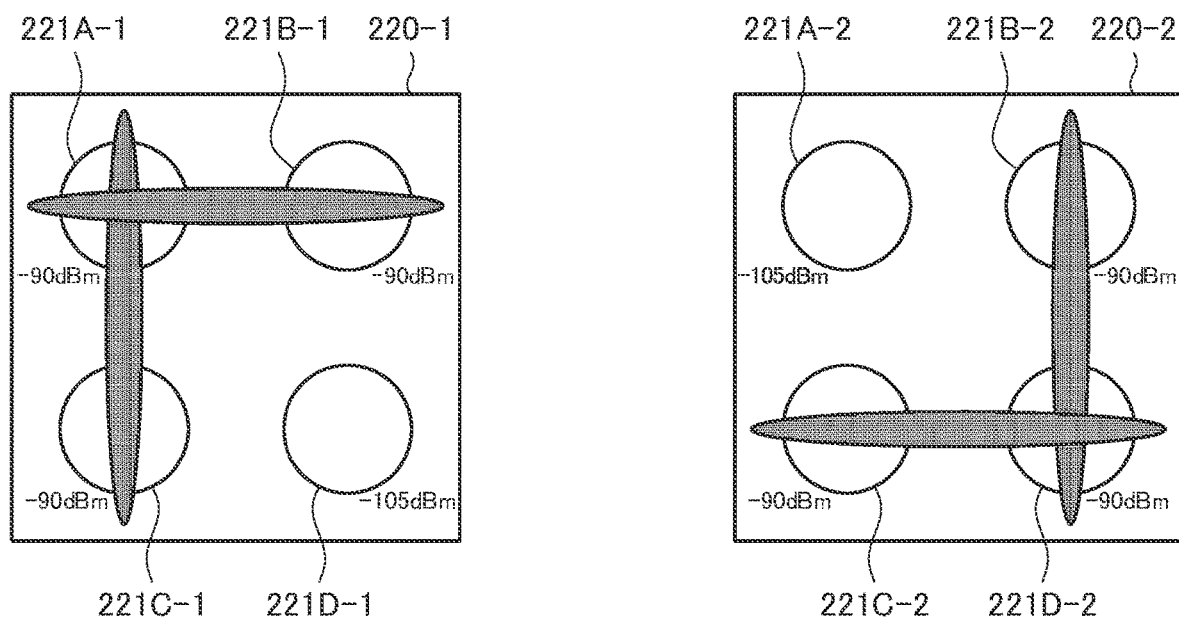
FIG. 10 is an explanatory diagram for describing a control example of the system 1 related to Example 2.

FIG. 10 is an explanatory diagram for describing a control example of the system 1 related to Example 2. As shown in FIG. 10, the communication unit 220-1 included in the in-vehicle device 200-1 has an antenna 221A-1, an antenna 221B-1, an antenna 221C-1, and an antenna 221D-1. The communication unit 220-2 included in the in-vehicle device 200-2 has an antenna 221A-2, an antenna 221B-2, an antenna 221C-2, and an antenna 221D-2.

In a case where the reception power is used as a reliability parameter, it is assumed that the parameter calculation unit 321 calculates each of the reliability parameters of the antenna 221A-1, the antenna 221B-1, and the antenna 221C-1 as "−90 dBm", and calculates the reliability parameter of the antenna 221D-1 as "−105 dBm", for example, as shown in FIG. 10. Subsequently, it is assumed that the parameter calculation unit 321 calculates the reliability parameter of the antenna 221A-2 as "−105 dBm", and calculates the reliability parameters of the antenna 221B-2, the antenna 221C-2, and the antenna 221D-2 as "−90 dBm".

In this case, the position estimation unit 325 may estimate a positional relationship between the portable device 100 and the in-vehicle device 200 on the basis of, for example, signals transmitted and received by three more reliable antennas. For example, the position estimation unit 325 may select three antennas 221 in descending order of reliability (for example, the reception power is large), and estimate a provisional positional relationship on the basis of the signals transmitted and received by the selected antenna 221.

For example, in the example shown in FIG. 10, three highly reliable antennas are the antenna 221A-1, the antenna 221B-1 and the antenna 221C-1 of the communication unit 220-1, and the antenna 221B-2, the antenna 221C-2, and the antenna 221D-2 of the communication unit 220-2.

The position estimation unit 325 estimates a provisional positional relationship on the basis of, for example, signals transmitted and received by the antenna 221A-1, the antenna 221B-1, and the antenna 221C-1 and the antenna 121 of the portable device 100. The position estimation unit 325 estimates a provisional positional relationship on the basis of signals transmitted and received by the antenna 221B-2, the antenna 221C-2, the antenna 221D-2, and the antenna 121 of the portable device 100.

The position estimation unit 325 applies the weight parameter to each estimated provisional positional relationship, and estimates a positional relationship between the portable device 100 and the in-vehicle device 200. For example, in a case where the positional relationship between the portable device 100 and the in-vehicle device 200 is set as a three-dimensional position of the portable device 100 with respect to the in-vehicle device 200, the position estimation unit 325 uses Equation 15 and performs weighted averaging on the provisional three-dimensional position of the portable device 100 to estimate a three-dimensional position of the portable device 100. Here, a provisional three-dimensional position of the portable device 100 estimated on the basis of the signals transmitted and received by the portable device 100 and the in-vehicle device 200-1 is denoted by $(x1,y1,z1)$, and a provisional three-dimensional position of the portable device 100 estimated on the basis of the signals transmitted and received by the portable device 100 and the in-vehicle device 200-2 is denoted by $(x2,y2,z2)$. The average reception power of the in-vehicle device 200-1 is denoted by P1, and the average reception power of the in-vehicle device 200-2 is denoted by P2.

$$X=(P1 \times x1+P2 \times x2)/(P1+P2)$$

$$Y=(P1 \times y1+P2y2)/(P1+P2)$$

$$Z=(P1 \times z1+P2z2)/(P1+P2) \qquad (15)$$

Equation 15 is an example of calculating a weighted average when an average value of the reliability parameters (average reception powers P1 and P2) is applied as the weight parameter. As the weight parameter, a weight parameter based on a reliability parameter may be calculated by using each equation described in Example 1.

Example of Operation Process

Figure 11:
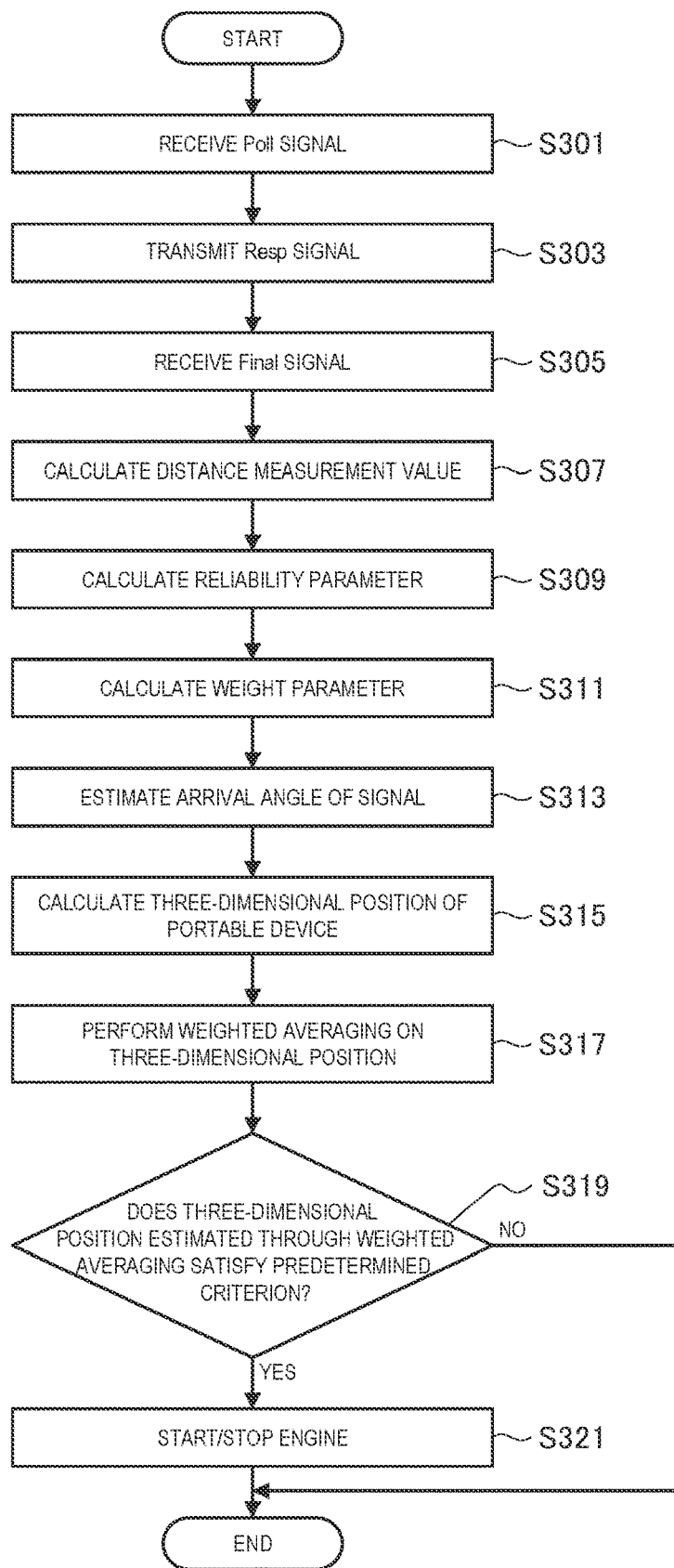
FIG. 11 is an explanatory diagram for describing an example of an operation process of the system 1 related to Example 2.

FIG. 11 is an explanatory diagram for describing an example of an operation process of the system 1 related to Example 2. First, the communication unit 120 included in the portable device 100 transmits a Poll signal, and the communication unit 220-1 included in the in-vehicle device 200-1 and the communication unit 220-2 included in the in-vehicle device 200-2 receive the Poll signal (S301).

Subsequently, the communication unit 220-1 and the communication unit 220-2 transmit a Resp signal as a response to the Poll signal, and the communication unit 120 receives the Resp signal (S303).

The communication unit 120 transmits a Final signal as a response to the Resp signal, and the communication unit 220-1 and the communication unit 220-2 receive the Final signal (S305). Here, the communication unit 220-1 and the communication unit 220-2 transmit various types of information regarding the transmitted and received signals to the communication unit 310 included in the control device 300.

Subsequently, the position estimation unit 325 calculates a first distance measurement value on the basis of the signals transmitted and received between the portable device 100 and the in-vehicle device 200-1, and calculates a second distance measurement value on the basis of the signals transmitted and received between the portable device 100 and the in-vehicle device 200-2 (S307).

Subsequently, the parameter calculation unit 321 calculates a first reliability parameter on the basis of the signal received by the in-vehicle device 200-1, and calculates a second reliability parameter on the basis of the signal received by the in-vehicle device 200-2 (S309).

The parameter calculation unit 321 calculates a weight parameter on the basis of each of the calculated reliability parameters (S311). For example, the parameter calculation unit 321 calculates a first weight parameter on the basis of the first reliability parameter, and calculates a second weight parameter on the basis of the second reliability parameter.

The position estimation unit 325 estimates an arrival angle of a first signal on the basis of the signals transmitted and received between the portable device 100 and the in-vehicle device 200-1, and estimates an arrival angle of a second signal on the basis of the signals transmitted and received between the portable device 100 and the in-vehicle device 200-2 (S313).

Subsequently, the position estimation unit 325 estimates a first provisional three-dimensional position of the portable device 100 on the basis of the arrival angle of the first signal, and estimates a second provisional three-dimensional position of the portable device 100 on the basis of the arrival angle of the second signal (S315).

The position estimation unit 325 performs weighted averaging based on the first weight parameter and the second weight parameter on the first provisional three-dimensional position and the second provisional three-dimensional position of the portable device 100, and estimates a three-dimensional position of the portable device 100 (S317).

The control unit 320 determines whether or not the three-dimensional position of the portable device 100 estimated through the weighted averaging satisfies a predetermined criterion (S319). In a case where the predetermined criterion is satisfied (S319: Yes), the control unit 320 causes the process to proceed to S321, and in a case where the predetermined criterion is not satisfied (S319: No), the control unit 320 ends the process.

In a case where the predetermined criterion is satisfied (S319: Yes), the control unit 320 performs operation control related to starting or stopping the engine, which is an example of the operation device 400 (S321), and the control unit 320 ends the process.

The control example related to Example 2 has been described above. According to the control related to Example 2, the control device 300 makes it possible to reduce the influence of the multipath, and can estimate a positional relationship between the portable device 100 and the in-vehicle device 200 with higher accuracy.

In Example 1 and Example 2, an example has been described in which the position estimation unit 325 calculates two weight parameters on the basis of signals transmitted and received by each of the in-vehicle device 200-1 and the in-vehicle device 200-2, and applies the weight parameters to a calculation process or a calculation result of a positional relationship between the portable device 100 and the in-vehicle device 200. As described above, by using a weight parameter based on a reliability parameter, the influence of a calculation error due to the multipath environment can be reduced. The control unit 320 may select the in-vehicle device 200, which is less affected by the multipath environment, on the basis of the reliability parameters transmitted and received by the in-vehicle device 200-1 and the in-vehicle device 200-2. Hereinafter, Example 3 will be described with reference to FIGS. 12 to 14.

3.3. Example 3

Figure 12:
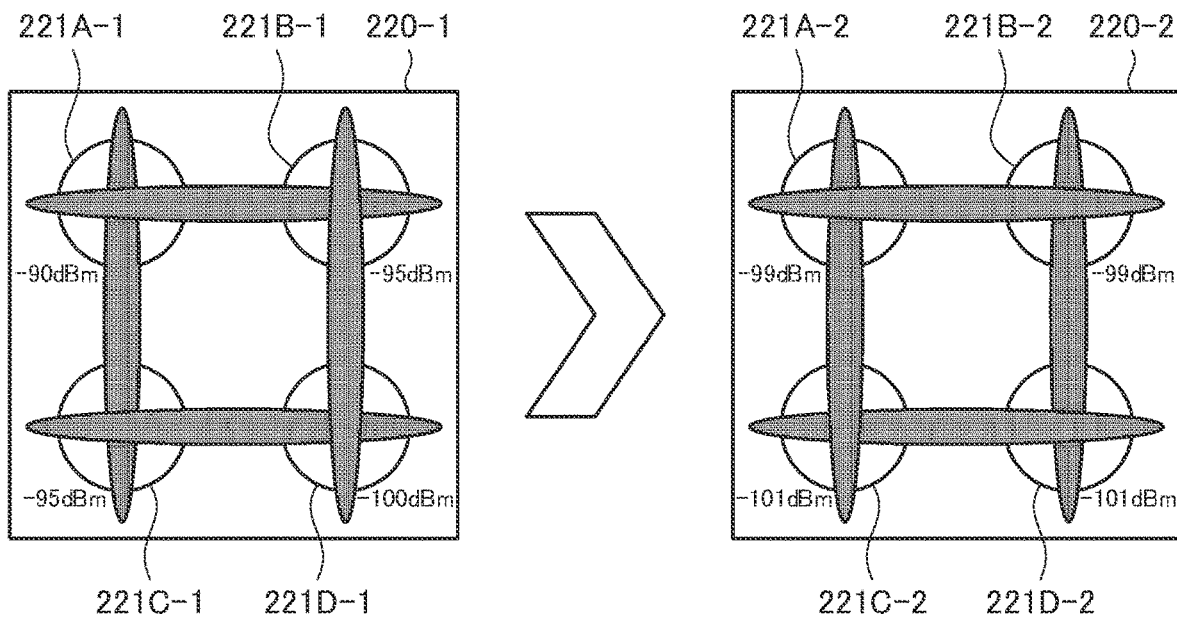
FIG. 12 is an explanatory diagram for describing a control example of the system 1 related to Example 3.

FIG. 12 is an explanatory diagram for describing a control example of the system 1 related to Example 3. The control unit 320 related to Example 3 compares reliability parameters calculated on the basis of signals received from the portable device 100 by each of the plurality of in-vehicle devices 200, and performs control for estimating a positional relationship on the basis of signals transmitted and received between the in-vehicle device 200 that has transmitted a signal that is more appropriate as a processing target for estimating the positional relationship and the portable device 100. In the following description, a reliability parameter will be described as the reception power of a signal received by the antenna 221 but may be another reliability parameter described above.

For example, the antenna 221A-1, the antenna 221B-1, the antenna 221C-1 and the antenna 221D-1 of the communication unit 220-1 included in the in-vehicle device 200-1 receive a Final signal from the antenna 121 of the communication unit 120 included in the portable device 100. Here, it is assumed that the reception power of the antenna 221A-1 is "−90 dBm", the reception power of the antenna 221B-1 is "−95 dBm", the reception power of the antenna 221C-1 is "−95 dBm", and the reception power of the antenna 221D-1 is "−100 dBm".

The antenna 221A-2, the antenna 221B-2, the antenna 221C-2 and the antenna 221D-2 of the communication unit 220-2 included in the in-vehicle device 200-2 receive a Final signal from the antenna 121 of the communication unit 120 included in the portable device 100. Here, it is assumed that the reception power of the antenna 221A-2 is "−99 dBm", the reception power of the antenna 221B-2 is "−99 dBm", the reception power of the antenna 221C-2 is "−101 dBm", and the reception power of the antenna 221D-2 is "−101 dBm".

In this case, the parameter calculation unit 321 calculates a basic statistic based on the reliability parameter (for example, reception power) estimated for each antenna. The basic statistic may be, for example, an average value, a maximum value, a minimum value, or a median value.

For example, when the basic statistics are averaged, the parameter calculation unit 321 may calculate "−95 dBm" as an average value of the reception powers of the antenna 221A-1, the antenna 221B-1, the antenna 221C-1, and the antenna 221D-1. The parameter calculation unit 321 may calculate "−100 dBm" as an average value of the reception powers of the antenna 221A-2, the antenna 221B-2, the antenna 221C-2, and the antenna 221D-2.

The position estimation unit 325 compares "−95 dBm" which is an average value of the reception powers of the antenna 221A-1, the antenna 221B-1, the antenna 221C-1, and the antenna 221D-1 with "−100 dBm" which is an average value of reception powers of the antenna 221A-2, the antenna 221B-2, the antenna 221C-2, and the antenna 221D-2.

The position estimation unit 325 selects the communication unit 220 that is more appropriate (that is, highly reliable) as a processing target for estimating a positional relationship. For example, the position estimation unit 325 may estimate a positional relationship between the portable device 100 and the in-vehicle device 200-1 on the basis of a signal transmitted and received between the communication unit 220-1 including the antenna 221-1 having a greater average value of reception power and the communication unit 120 included in the portable device 100.

The position estimation unit 325 may select three antennas out of four or more antennas in each of the plurality of in-vehicle devices 200 on the basis of a reliability parameter. The position estimation unit 325 may compare reliability parameters calculated on the basis of signals received by the respective three selected antennas. The position estimation unit 325 may estimate a positional relationship between the portable device 100 and the in-vehicle device 200 on the basis of a signal transmitted and received between the in-vehicle device 200 that has received a signal that is more appropriate as a processing target for estimating a positional relationship on the basis of a result of the comparison and the portable device 100.

Figure 13:
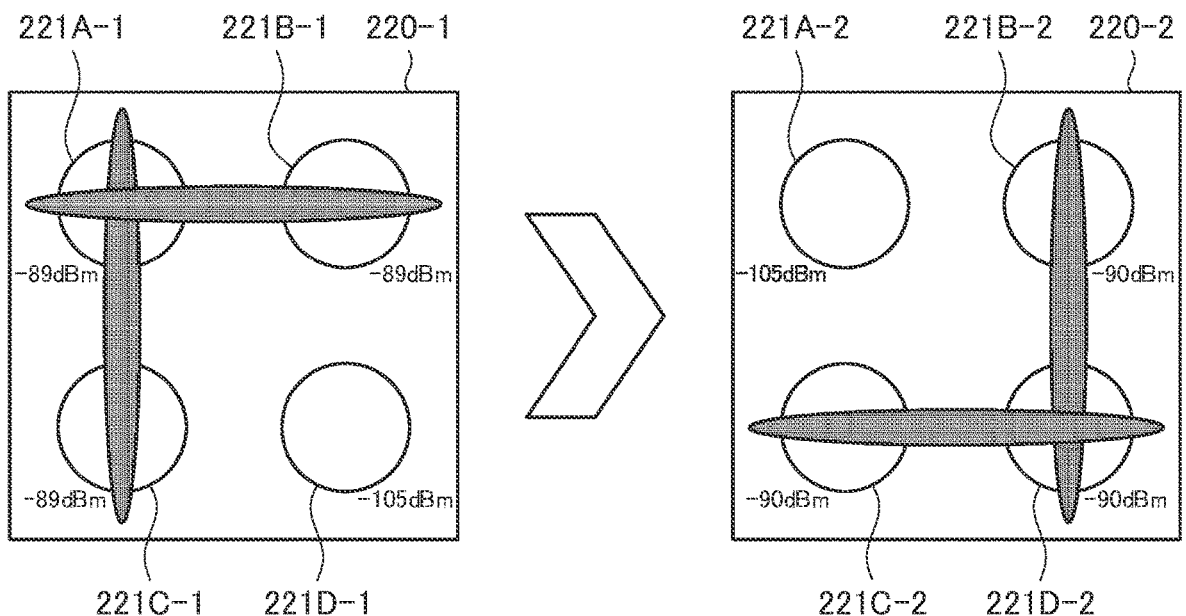
FIG. 13 is an explanatory diagram for describing another control example of the system 1 related to Example 3.

FIG. 13 is an explanatory diagram for describing another control example of the system 1 related to Example 3. For example, the antenna 221A-1, the antenna 221B-1, the antenna 221C-1, and the antenna 221D-1 of the communication unit 220-1 included in the in-vehicle device 200-1 receive a Final signal from the antenna 121 of the communication unit 120 included in the portable device 100. Here, it is assumed that the reception power of the antenna 221A-1 is "−89 dBm", the reception power of the antenna 221B-1 is "−89 dBm", the reception power of the antenna 221C-1 is "−89 dBm", and the reception power of the antenna 221D-1 is "−105 dBm". In this case, the position estimation unit 325 may select the antenna 221A-1, the antenna 221B-1, and the antenna 221C-1 in descending order of the reception power.

The antenna 221A-2, the antenna 221B-2, the antenna 221C-2, and the antenna 221D-2 of the communication unit 220-2 included in the in-vehicle device 200-2 receive the Final signal from the antenna 121 of the communication unit 120 included in the portable device 100. Here, it is assumed that the reception power of the antenna 221A-2 is "−105 dBm", the reception power of the antenna 221B-2 is "−90 dBm", the reception power of the antenna 221C-2 is "−90 dBm", and the reception power of the antenna 221D-2 is "−90 dBm". In this case, the position estimation unit 325 may select the antenna 221B-2, the antenna 221C-2, and the antenna 221D-2 in descending order of the reception power.

In a case where each of the plurality of in-vehicle devices 200 has N (where 4≤N) antennas, the position estimation unit 325 may select M (where 3≤M≤N) antennas out of the N antennas in each of the plurality of in-vehicle devices 200 on the basis of a reliability parameter.

Subsequently, the position estimation unit 325 compares reliability parameters calculated on the basis of signals received by the respective three antennas selected for each of the in-vehicle device 200-1 and the in-vehicle device 200-2.

In a case where a method of comparing reliability parameter average values of the respective antennas 221 is used, the position estimation unit 325 acquires a comparison result that the average reception power of the antenna 221A-1, the antenna 221B-1, and the antenna 221C-1 of the in-vehicle device 200-1 is higher than that of the antenna 221B-2, the antenna 221C-2, and the antenna 221D-2 of the in-vehicle device 200-2 and a signal that is more appropriate as a processing target for estimating a positional relationship has been transmitted and received.

The position estimation unit 325 executes a process of estimating a positional relationship between the portable device 100 and the in-vehicle device 200-1 on the basis of signals transmitted and received between the in-vehicle device 200-1 that has transmitted and received the signal that is more appropriate as a processing target for estimating a positional relationship and the portable device 100. The positional relationship between the portable device 100 and the in-vehicle device 200-1 may be an arrival angle of a signal or may be a two-dimensional position or a three-dimensional position of the portable device 100 as in Example 1 and Example 2.

The position estimation unit 325 may select, from each of the plurality of in-vehicle devices 200, an antenna of which a reliability parameter based on a received signal satisfies a specified criterion among four or more antennas of each of the plurality of in-vehicle devices 200. For example, the position estimation unit 325 may select, from each of the plurality of in-vehicle devices 200, an antenna of which a reliability parameter based on a received signal is a predetermined value among the four or more antennas of each of the plurality of in-vehicle devices 200. More specifically, for example, in a case where a reliability parameter is the reception power and a predetermined value is −90 dBm, the position estimation unit 325 may select an antenna in which the reception power of a received signal is equal to or more than −90 dBm among the four or more antennas. The position estimation unit 325 may compare reliability parameters of the selected antennas by each of the plurality of in-vehicle devices 200.

Example of Operation Process

Figure 14:
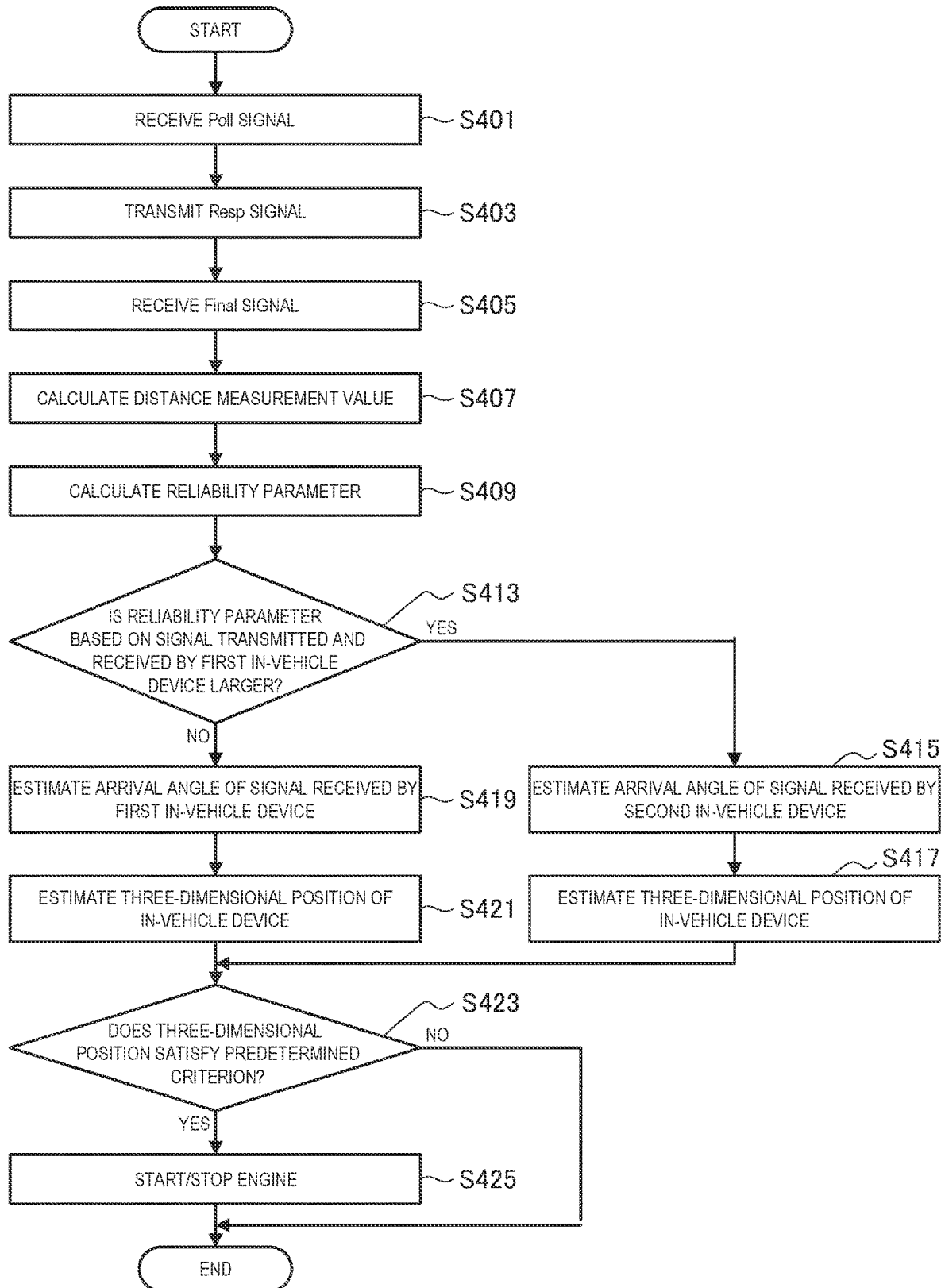
FIG. 14 is an explanatory diagram for describing an example of an operation process of the system 1 related to Example 3.

FIG. 14 is an explanatory diagram for describing an example of an operation process of the system 1 related to Example 3. In the following description, an operation process in a case where the reliability of a transmitted and received signal becomes higher as a value of a reliability parameter becomes smaller will be described. First, the communication unit 120 included in the portable device 100 transmits a Poll signal, and the communication unit 220-1 included in the in-vehicle device 200-1 and the communication unit 220-2 included in the in-vehicle device 200-2 receive the Poll signal (S401).

Subsequently, the communication unit 220-1 and the communication unit 220-2 transmit a Resp signal as a response to the Poll signal, and the communication unit 120 receives the Resp signal (S403).

The communication unit 120 transmits a Final signal as a response to the Resp signal, and the communication unit 220-1 and the communication unit 220-2 receive the Final signal (S405). Here, the communication unit 220-1 and the communication unit 220-2 transmit various types of information regarding the transmitted and received signals to the communication unit 310 included in the control device 300.

Subsequently, the position estimation unit 325 calculates a first distance measurement value on the basis of the signals transmitted and received between the portable device 100 and the in-vehicle device 200-1, and calculates a second distance measurement value on the basis of the signals transmitted and received between the portable device 100 and the in-vehicle device 200-2 (S407).

Subsequently, the parameter calculation unit 321 calculates a first reliability parameter on the basis of the signal received by the in-vehicle device 200-1, and calculates a second reliability parameter on the basis of the signal received by the in-vehicle device 200-2 (S409).

The control unit 320 determines whether or not the reliability parameter based on the signal received by the in-vehicle device 200-1 is larger than the reliability parameter based on the signal received by the in-vehicle device 200-2 (S413). In a case where the reliability parameter based on the signal received by the in-vehicle device 200-1 is larger (S413: Yes), the control unit 320 causes the process to proceed to S415, and in a case where the reliability parameter based on the signal received by the in-vehicle device 200-2 is larger (S413: No), the control unit 320 causes the process to proceed to S419.

In a case where the reliability parameter based on the signal received by the in-vehicle device 200-1 is larger (S413: Yes), the position estimation unit 325 estimates an arrival angle of a signal on the basis of the signal transmitted and received by the communication unit 220-2 included in the in-vehicle device 200-2 (S415).

The position estimation unit 325 estimates a three-dimensional position of the portable device 100 on the basis of the estimated arrival angle of the signal and the second distance measurement value (S417).

In a case where the reliability parameter based on the signal received by the in-vehicle device 200-2 is larger (S413: No), the position estimation unit 325 estimates an arrival angle of a signal on the basis of the signal transmitted and received by the communication unit 220-1 included in the in-vehicle device 200-1 (S419).

The position estimation unit 325 estimates a three-dimensional position of the portable device 100 on the basis of the estimated arrival angle of the signal and the second distance measurement value (S421).

The control unit 320 determines whether or not the estimated three-dimensional position of the portable device 100 satisfies a predetermined criterion (S423). In a case where the predetermined criterion is satisfied (S423: Yes), the control unit 320 causes the process to proceed to S425, and in a case where the predetermined criterion is not satisfied (S423: No), the control unit 320 ends the process.

In a case where the predetermined criterion is satisfied (S423: Yes), the control unit 320 performs operation control related to starting or stopping the engine, which is an example of the operation device 400 (S425), and the control unit 320 ends the process.

An example of an operation process of the system 1 related to Example 3 has been described above. An operation process in a case where there are a plurality of in-vehicle devices 200 is not limited to the above example. For example, after a Poll signal, a Resp signal, and a Final signal are transmitted and received between the communication unit 120 included in the portable device 100 and the communication unit 220-1 included in the in-vehicle device 200-1, a Poll signal, a Resp signal, and a Final signal may be transmitted and received between the communication unit 120 and the communication unit 220-2 included in the in-vehicle device 200-2. The position estimation unit 325 may estimate a first three-dimensional position of the portable device 100 on the basis of the signals transmitted and received between the portable device 100 and the in-vehicle device 200-1, and estimate a second three-dimensional position of the portable device 100 on the basis of the signals transmitted and received between the portable device 100 and the in-vehicle device 200-2, and then the control unit 320 may compare reliability parameters. For example, in a case where it is determined that the in-vehicle device 200-1 has transmitted and received a signal having higher reliability than the in-vehicle device 200-2, the control unit 320 may set the first three-dimensional position as a three-dimensional position of the portable device 100.

According to the control related to Example 3 described above, the control device 300 can estimate a positional relationship between the portable device 100 and the in-vehicle device 200 with higher accuracy by selecting the in-vehicle device 200 having a smaller influence of multipath.

Although the details of Example 1, Example 2, and Example 3 have been described, the control device 30 according to the present embodiment may perform control by combining the above Example 1 with one of Example 2 or Example 3.

In a case where Example 1 is combined with Example 2, for example, the position estimation unit 325 performs weighted averaging using a weight parameter based on a reliability parameter on an inter-antenna phase difference of antenna pair of the in-vehicle device 200-1. The position estimation unit 325 estimates an arrival angle of a signal and a provisional three-dimensional position of the portable device 100 on the basis of the inter-antenna phase difference subjected to the weighted averaging. The position estimation unit 325 estimates a arrival angle of a signal and a provisional three-dimensional position of the portable device 100 through the same process in the in-vehicle device 200-2. The position estimation unit 325 may perform weighted averaging based on a reliability parameter on the estimated two provisional three-dimensional positions of the portable device 100 to estimate a three-dimensional position of the portable device 100.

In a case where Example 1 is combined with Example 3, for example, the position estimation unit 325 compares respective reliability parameters of the in-vehicle device 200-1 and the in-vehicle device 200-2, and selects the in-vehicle device 200 for estimating a positional relationship with the portable device 100 according to a result of the comparison. Next, the position estimation unit 325 performs weighted averaging using a weight parameter based on a reliability parameter on the inter-antenna phase difference of the antenna pair of the selected in-vehicle device 200. The position estimation unit 325 may estimate an arrival angle of a signal and a three-dimensional position of the portable device 100 on the basis of the inter-antenna phase difference subjected to the weighted averaging.

According to the control in combination between Example 1 and one of Example 2 or Example 3 described above, the control device 30 can estimate a positional relationship between the portable device 100 and the in-vehicle device 200 with higher accuracy.

4. Appendix

Although the preferred embodiments of the present invention have been described in detail with reference to the accompanying drawings, the present invention is not limited to these examples. It is clear that a person skilled in the art can conceive of various changes or modifications within the scope of the technical ideas disclosed in the claims, and these are also naturally understood to belong to the technical scope of the present invention.

For example, the series of processes by each device described in the present specification may be realized by using any of software, hardware, and a combination of software and hardware. A program forming the software is stored in advance in, for example, a recording medium (non-transitory media) provided inside or outside each device. Each program is read into a RAM at the time of execution by a computer and executed by a processor such as a CPU. The recording medium is, for example, a magnetic disk, an optical disc, a magneto-optical disc, or a flash memory. The above computer program may be distributed via, for example, a network instead of using a recording medium.

The steps in the processing of the operation of the system 1 according to the present embodiment do not necessarily have to be processed in a time series according to the order described as the explanatory diagram. For example, each step in the processing of the operation of the system 1 may be processed in an order different from the order described in the explanatory diagram, or may be processed in parallel.

What is claimed is:

1. A control device comprising:
   a control unit that performs control for estimating a positional relationship between a communication device having four or more antennas and another communication device on the basis of signals transmitted and received between the communication device and the other communication device, wherein
   the control unit applies a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performs control for estimating the positional relationship.

2. The control device according to claim 1, wherein
   the control unit performs weighted averaging based on the weight parameter on a phase difference between antennas in directions parallel to each other among the four or more antennas, and performs control for estimating the positional relationship.

3. The control device according to claim 1, wherein
   the control unit estimates an arrival angle of the signal received from the other communication device by the communication device as the positional relationship between the communication device and the other communication device.

4. The control device according to claim 3, wherein
   the control unit performs control for estimating a two-dimensional position or a three-dimensional position of the other communication device on the basis of the arrival angle of the signal.

5. The control device according to claim 1, wherein
   the weight parameter is a value indicated by the reliability parameter.

6. The control device according to claim 1, wherein
   the weight parameter indicates a first value when the reliability parameter is equal to or more than a specified value, and indicates a second value when the reliability parameter is less than the specified value.

7. The control device according to claim 1, wherein
   the weight parameter indicates a first value when the reliability parameter is equal to or more than a first specified value, indicates a second value when the reliability parameter is less than a second specified value smaller than the first specified value, and indicates a third value calculated by using a specified function when the reliability parameter is equal to or more than the second specified value and less than the first specified value.

8. The control device according to claim 7, wherein
   the specified function is a monotonic increase or monotonic decrease function.

9. The control device according to claim 8, wherein
   the specified function is a linear function.

10. The control device according to claim 8, wherein
    the specified function is a trigonometric function.

11. The control device according to claim 8, wherein
    the specified function is an exponential function.

12. The control device according to claim 6, wherein
    the first value is either 0 or 1, and
    the second value is the other of 0 or 1.

13. The control device according to claim 1, wherein
    the reliability parameter includes at least one of an index indicating a magnitude of noise of a signal received by at least one of the communication device and the other communication device, or an index indicating a validity that the signal is based on a direct wave.

14. The control device according to claim 1, wherein
    the communication device is mounted on a moving object.

15. The control device according to claim 14, wherein
    the other communication device is carried by a user who is using the moving object.

16. The control device according to claim 1, wherein
    the signals include a wireless signal compliant with ultra-wideband wireless communication.

17. A system comprising:
    a communication device that has four or more antennas;
    another communication device that has one or more antennas; and
    a control device that performs control for estimating a positional relationship between the communication device and the other communication device on the basis of signals transmitted and received between the communication device and the other communication device, wherein
    the control device applies a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performs control for estimating the positional relationship.

18. A control method executed by a computer, comprising:
transmitting and receiving signals between a communication device having four or more antennas and another communication device; and
performing control for estimating a positional relationship between the communication device and the other communication device on the basis of the transmitted and received signals, wherein
the performing control for estimating a positional relationship between the communication device and the other communication device includes
applying a weight parameter based on a reliability parameter that is an index indicating a degree of whether or not a signal is appropriate as a processing target for estimating a positional relationship between the communication device and the other communication device calculated on the basis of a signal received from the other communication device by the communication device to a phase difference between adjacent antennas of the four or more antennas of the communication device, and performing control for estimating the positional relationship.

* * * * *